United States Patent
Yamamoto et al.

[11] Patent Number: 6,007,210
[45] Date of Patent: Dec. 28, 1999

[54] DISCHARGE LAMP DEVICE HAVING A LIGHT DISTRIBUTION COMPOUND LENS

[75] Inventors: Noboru Yamamoto, Kariya; Kenji Yoneima, Oobu; Masamichi Ishikawa, Hekinan; Hiroaki Okuchi, Anjo; Hiromi Hiramatsu, Kariya, all of Japan

[73] Assignee: Denso Corporation, Kariya, Japan

[21] Appl. No.: 08/713,964

[22] Filed: Sep. 12, 1996

[30] Foreign Application Priority Data

| Sep. 12, 1995 | [JP] | Japan | 7-234271 |
| Sep. 27, 1995 | [JP] | Japan | 7-249893 |
| Oct. 6, 1995 | [JP] | Japan | 7-260476 |

[51] Int. Cl.$^6$ ................................. B60Q 1/09
[52] U.S. Cl. ..................... 362/61; 362/268; 362/331
[58] Field of Search ................... 362/331, 61, 268

[56] References Cited

U.S. PATENT DOCUMENTS

| 5,068,768 | 11/1991 | Kobayashi | 362/331 |
| 5,317,237 | 5/1994 | Allison et al. | 315/307 |

FOREIGN PATENT DOCUMENTS

| 415496 | 3/1991 | European Pat. Off. . |
| 456247 | 11/1991 | European Pat. Off. . |
| 459126 | 12/1991 | European Pat. Off. . |
| 623780 | 5/1994 | European Pat. Off. . |
| 618754 | 10/1994 | European Pat. Off. . |
| 4428850 | 2/1995 | Germany . |
| 61-250902 | 11/1986 | Japan . |
| 63-040201 | 2/1988 | Japan . |
| 63-113406 | 5/1988 | Japan . |
| 60-54521 | 2/1994 | Japan . |
| 60-82799 | 11/1994 | Japan . |
| 70-65973 | 3/1995 | Japan . |
| 80-43661 | 2/1996 | Japan . |

Primary Examiner—Michael B Shingleton
Attorney, Agent, or Firm—Pillsbury Madison & Sutro LLP

[57] ABSTRACT

In a discharge lamp device, the electric power supplied to a discharge lamp is controlled in order of first to fourth control regions from the start of lighting of the discharge lamp. In the first control region, the lamp current is held constant until the lamp voltage reaches a first voltage value. In the second control region, the lamp current is reduced so as to have a correlation with a first time constant curve for a constant time after the lamp voltage reaches the first voltage value. In the third control region, the lamp current is reduced so as to have a correlation with a second time constant curve after a lapse of the constant time. The second time constant curve differs from the first time constant curve. In the fourth control region, a control value of the electric power supplied to the discharge lamp is free of a function of a lapse of time from the start of lighting of the discharge lamp, but is a function of at least the lamp voltage and the lamp current, and the electric power supplied to the discharge lamp is controlled by that control value. Through such a control, luminous flux is built up in a short time from the start of the lighting and an occurrence of overshoot or undershoot is minimized to a possible extent.

11 Claims, 15 Drawing Sheets

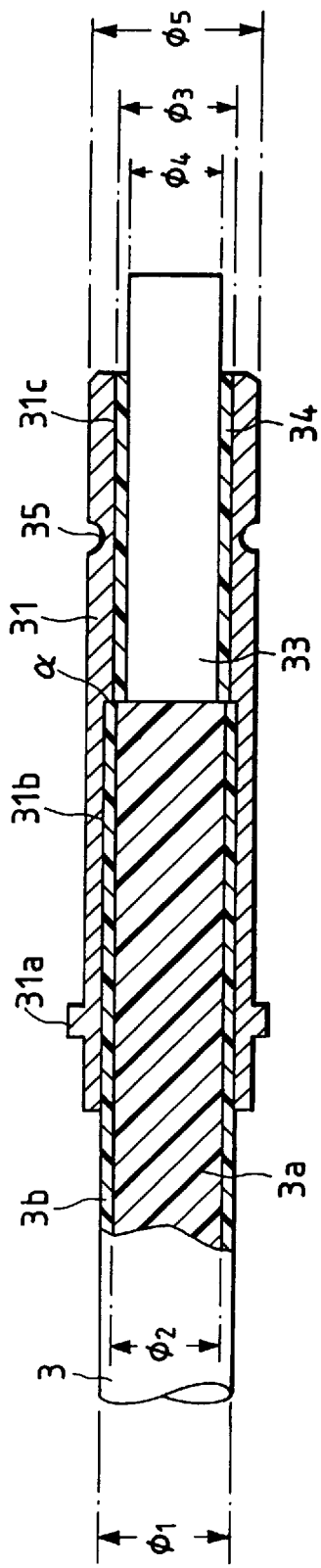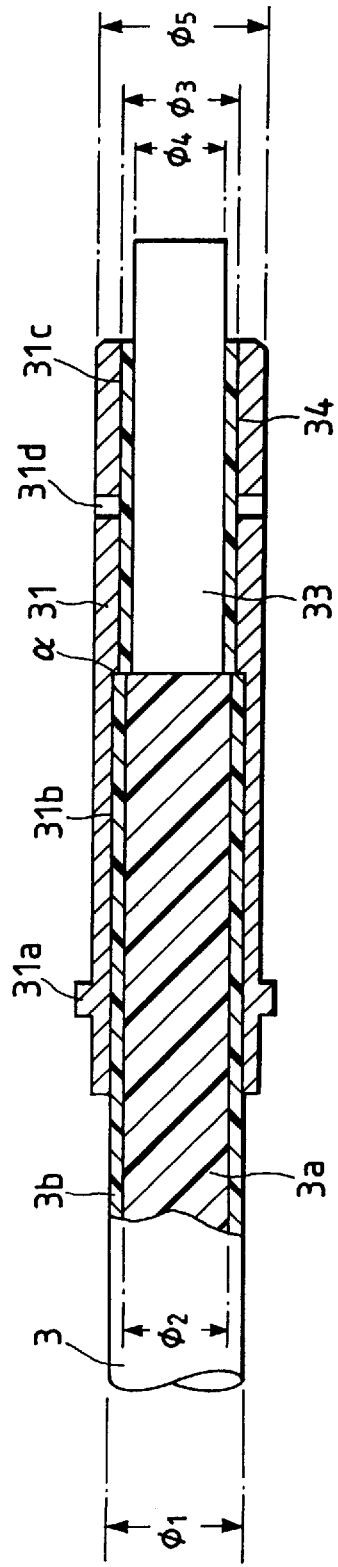

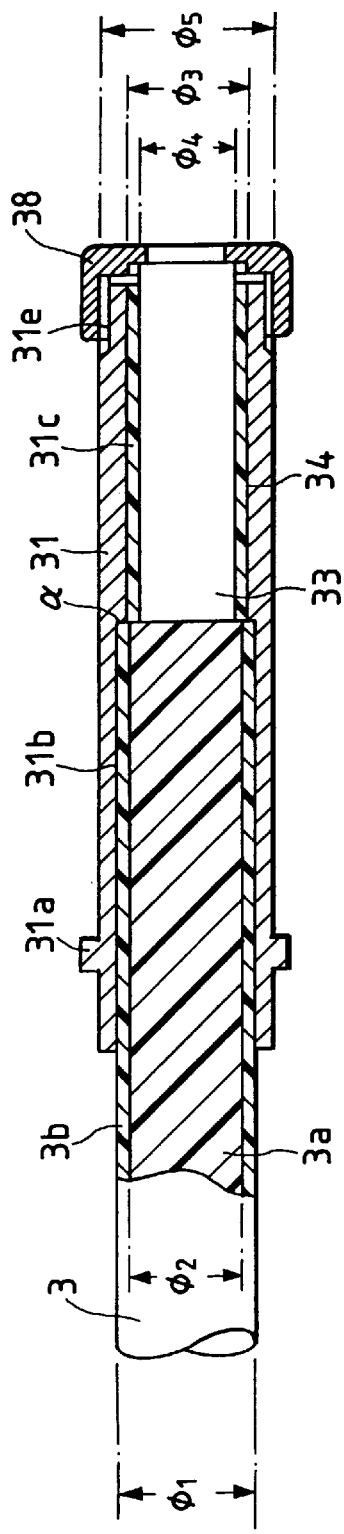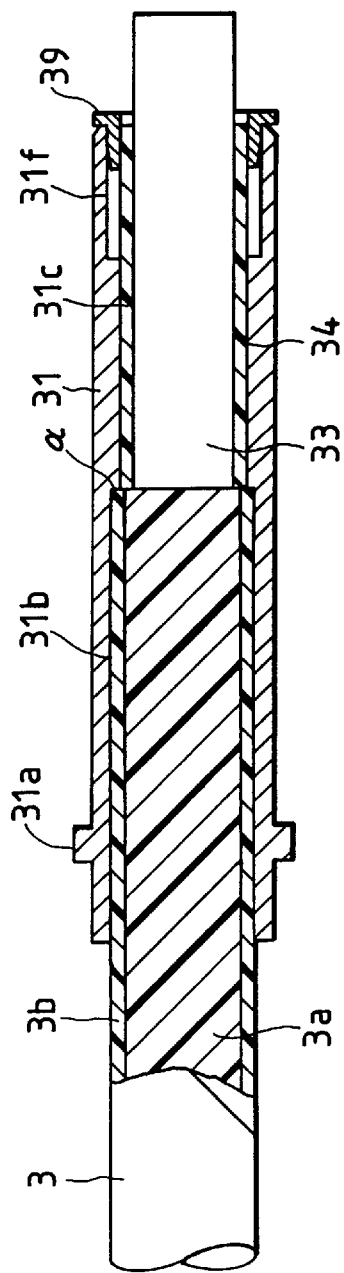

DISCHARGE LAMP DEVICE HAVING A LIGHT DISTRIBUTION COMPOUND LENS

BACKGROUND OF THE INVENTION

1. Field of the Invention

The present invention relates to a discharge lamp device for use in a vehicular headlight arrangement for an automobile, an electric railcar, a ship, an aircraft or the like, or in a general lighting system. The discharge lamp device includes a control circuit for controlling an electric power applied to a discharge lamp, an optical cable coupled at its one end to a light unit with the discharge lamp therein via a coupling arrangement, and a light distribution unit coupled to the other end of the optical cable for achieving a given light distribution.

2. Description of the Prior Art

In recent years, a metal halide lamp (discharge lamp) has drawn attention as a light source of the vehicular headlight. In general, it takes time for the discharge lamp to stabilize its luminous flux from the lighting thereof. Thus, for using it as a light source of the vehicular headlight, it is necessary to shorten the time until the luminous flux is stabilized.

For achieving this, a method has been known as disclosed for example in Japanese First (unexamined) Patent Publication No. 6-54521, wherein an excessive lamp current is fed to the discharge lamp just after the lighting so as to shorten the time until the luminous flux is stabilized. Specifically, upon cold starting of the discharge lamp, the lamp current is controlled at a given constant current value greater than a stable-time current value for a given fixed time from the lighting, and then the lamp current is exponentially reduced using a timer circuit so that a stable lighting state is reached.

In this conventional method, however, as shown in FIG. 7, the luminous flux at the start of the lighting may be subjected to overshoot A or undershoot B relative to the luminous flux at the stable time, and further, a build-up characteristic D of the luminous flux may be subjected to dispersion due to dispersion in quality of the individual discharge lamps. Thus, the foregoing conventional method is not preferable for the vehicular headlight.

On the other hand, an optical cable is composed of a clad member and a core member having mutually different refractive indexes and used for transmitting the light by means of the total reflection at an interface between the clad member and the core member due to a difference in refractive index. In recent years, this type of optical cables has been used in various industrial fields, such as, optical communications, optical sensors, decorative displays and various lighting systems of automobiles, optical instruments, medical instruments, outdoor signboards, domestic electrical devices and so forth.

For example, Japanese First (unexamined) Patent Publication No. 61-250902 proposes a light irradiation arrangement, wherein light emitted from a light source is transmitted through an optical cable of the foregoing type to an object (to be irradiated) arranged at a given place such that radiation heat from the light source is not transferred to the object. The optical cable proposed in this publication is arranged such that a fluororesin plastic pipe having a small refractive index is filled therein with liquid-phase glycerin for the total reflection of the light, and glass rods are fitted into the plastic pipe at both opposite ends thereof for sealing.

However, in such an optical cable filled with the liquid such as glycerin, since the plastic pipe is sealed by the glass rods fitted in at the ends thereof, there is raised a problem of leakage of the liquid from between the plastic pipe and each of the glass rods.

On the other hand, another optical cable of the foregoing type has been developed and manufactured, wherein a clad member made of synthetic resin with a small refractive index and a core member made of synthetic resin with a refractive index greater than that of the clad member are formed integral with each other to form a flexible optical cable.

However, if such an optical cable of the synthetic resin is located near a light source, such as a halogen lamp or a high-pressure mercury lamp, there is raised a problem that the optical cable is softened or deformed due to the direct heat or the radiation heat from the light source so as to cause a dislocation of an optical axis. If the dislocation of the optical axis occurs, the utilization efficiency and the transmission efficiency of the light are deteriorated so that the object can not be lightened with the required illuminance.

On the other hand, if a glass rod having a heat cut filter function is disposed at an end portion, near the light source, of such a synthetic resin optical cable, the direct heat or the radiation heat from the light source can be intercepted by the glass rod. However, the light entering the glass rod from the light source leaks to the exterior through the peripheral walls of the glass rod so that the quantity of the incident light into the optical cable is reduced. Thus, the utilization efficiency and the transmission efficiency of the light are lowered so that the object can not be lightened with the required illuminance.

It may also be considered to integrate the optical cable and the glass rod using the clad member of the optical cable. However, this is not practical since the core member and the clad member are formed integral with each other in this type of the synthetic resin optical cable so that a process for removing the core member is required.

On the other hand, Japanese First (unexamined) Patent Publication No. 63-40201 proposes a vehicular headlight arrangement, wherein the desired spreading of a light distribution in left and right directions can be achieved without causing an upper boundary to be ambiguous. Specifically, in this publication, a light distribution pattern forming shade plate is disposed at approximate focal points of condenser lenses forming a condenser lens unit, and a reflecting mirror is provided for producing the reflected light which converges along a line connecting the focal points of the respective condenser lenses. With this arrangement, shading boundaries caused by the light distribution pattern forming shade plate are projected forward through the condenser lens unit so that the light distribution as shown in FIG. 20B can be achieved.

However, in such an arrangement, about a half of the reflected light from the reflecting mirror is intercepted due to the light distribution pattern forming shade plate as shown by hatched lines in FIG. 20A. Thus, there is raised a problem of poor utilization efficiency of the light and thus an occurrence of the insufficient illuminance. Further, for achieving the desired light distribution, the reflecting mirror, the light distribution pattern forming shade plate and the like are required so that the number of the components is increased to render a structure of the vehicular headlight arrangement complicated.

SUMMARY OF THE INVENTION

Therefore, it is an object of the present invention to provide an improved discharge lamp device, wherein an electric power supplied to a discharge lamp is controlled such that luminous flux is built up in a short time from the start of the lighting and an occurrence of overshoot or undershoot is minimized to a possible extent so as to achieve an approximately flat build-up characteristic of the luminous flux.

It is another object of the present invention to provide an improved discharge lamp device, wherein, even if a glass rod having a heat cut filter function is disposed at an end portion, near a light source, of an optical cable made of synthetic resin, the utilization efficiency and the transmission efficiency of light are not lowered, and further, the glass rod can be connected to the optical cable simply and easily.

It is another object of the present invention to provide an improved discharge lamp device, wherein lowering of the quantity of light due to a light distribution pattern forming shade plate can be suppressed, and further, a desired light distribution suitable for a vehicular light distribution can be achieved.

It is another object of the present invention to provide an improved optical cable coupling assembly, wherein, even if a glass rod having a heat cut filter function is disposed at an end portion, near a light source, of an optical cable made of Synthetic resin, the utilization efficiency and the transmission efficiency of light are not lowered, and further, the glass rod can be connected to the optical cable simply and easily.

According to one aspect of the present invention, a discharge lamp device comprises lamp power feed means for supplying an electric power to a discharge lamp; lamp voltage conversion means for converting a lamp voltage to a value depending on the lamp voltage and outputting the converted value; lamp current detection means for detecting a lamp current; and power control means, responsive to output signals from the lamp voltage conversion means and the lamp current detection means, for controlling the lamp power feed means such that the electric power supplied from the lamp power feed means to the discharge lamp is controlled in order of first to fourth control regions from the start of lighting of the discharge lamp, wherein in the first control region the lamp current is held constant until the lamp voltage reaches a first given voltage value, in the second control region the lamp current is reduced so as to have a correlation with a first time constant curve for a predetermined time after the lamp voltage reaches the first given voltage value, in the third control region the lamp current is reduced so as to have a correlation with a second time constant curve after a lapse of the predetermined time, the second time constant curve differing from the first time constant curve, and in the fourth control region a control value of the electric power supplied to the discharge lamp is free of a function of a lapse of time from the start of lighting of the discharge lamp, but is a function of at least the lamp voltage and the lamp current, and the electric power supplied to the discharge lamp is controlled by the control value.

It may be arranged that the power control means further comprises a power correction circuit for correcting the electric power supplied to the discharge lamp based on the lamp voltage, and that the power control means reduces the electric power supplied to the discharge lamp based on the lamp voltage when the lamp voltage exceeds a predetermined voltage value, only in the first to third control regions.

It may be arranged that, when the lamp voltage does not reach the first given voltage value in the first control region, the lamp current is controlled to be constant for a given time from the start of lighting of the discharge lamp, and thereafter, the lamp current is controlled to be reduced gradually with a lapse of time so as to shift to the fourth control region.

It may be arranged that the power control means comprises a lamp voltage detection circuit for detecting whether the lamp voltage is no less than the first given voltage value, and a mask circuit for nullifying a result of the detection by the lamp voltage detection circuit due to the lamp voltage being no less than the first given voltage value, immediately after the start of lighting of the discharge lamp, the result of the detection being that the lamp voltage is no less than the first given voltage value.

It may be arranged that the mask circuit prohibits a correction of the electric power supplied to the discharge lamp by the power correction circuit for a predetermined time from the start of lighting of the discharge lamp.

It may be arranged that the lamp voltage conversion means outputs a constant value, as the converted value, free of the lamp voltage when the lamp voltage is less than a second given voltage value, and outputs a value having a correlation with the lamp voltage when the lamp voltage is no less than the second given voltage value, the second given voltage value being greater than the first given voltage value and lower than the lamp voltage in a stable lighting state of the discharge lamp.

It may be arranged that the power control means comprises a time constant circuit for preparing the first time constant curve and the second time constant curve, and that the tire constant circuit prepares the first and second time constant curves by providing two kinds of charging routes relative to one capacitor.

It may be arranged that the time constant circuit detects a period over which the supply of the electric power to the discharge lamp has stopped, and controls an electric power applied to the discharge lamp upon restarting of lighting of the discharge lamp depending on the detected period.

It may be arranged that a light distribution compound lens is further included for forming a given light distribution, the light distribution compound lens comprising a first lens portion for condensing and irradiating light from the discharge lamp; and a second lens portion, provided at a side of the first lens portion closer to the discharge lamp, for deflecting the light from the discharge lamp in a given direction before the light is condensed by the first lens portion, wherein a curved surface of the second lens portion is given as a curved surface of a cylindrical lens, and wherein the cylindrical lens has an axis inclined by a given angle in one of left and right directions relative to a vertical direction and forms a slantly extending cutline light distribution depending on the inclination angle of the axis.

It may be arranged that the second lens portion is located below an optical axis of the light distribution compound lens.

It may be arranged that the light distribution compound lens further comprises a third lens portion, provided at the side of the first lens portion closer to the discharge lamp, for deflecting the light from the discharge lamp in a given direction before the light is condensed by the first lens portion, that a curved surface of the third lens portion is given as a curved surface of a cylindrical lens, and that the cylindrical lens has an axis set in the vertical direction and forms a flat light distribution spreading in a horizontal direction.

It may be arranged that the curved surface of the second lens portion further bends along the axis.

It may be arranged that an incidence plane of the third lens portion is formed by combining a plurality of curved surfaces having different radii of curvature, and that the radii of curvature of the plurality of curved surfaces are set smaller as located closer to a center portion of the third lens portion.

It may be arranged that an optical cable coupling assembly further included for connecting together a housing with the discharge lamp therein and a synthetic resin optical cable composed of a core member and a clad member for transmitting light emitted from the discharge lamp to a given place, the optical cable coupling assembly comprising a cable holder holding the synthetic resin optical cable and attached to the housing; and a glass rod inserted into the cable holder so as to abut an end surface of the synthetic resin optical cable and having a function of a heat cut filter, wherein a resin film having a refractive index smaller than that of the glass rod is provided on a surface of the glass rod, and wherein the glass rod is fixed to the cable holder via the resin film.

It may be arranged that the cable holder comprises a first cable holder holding the synthetic resin optical cable and the glass rod in a fixed fashion, and a second cable holder holding the first cable holder and attached to the housing.

It may be arranged that an outer diameter of the glass rod with the resin film provided thereon is set smaller than an outer diameter of the synthetic resin optical cable, and that an outer diameter of the glass rod is set equal to or smaller than an outer diameter of the core member of the synthetic resin optical cable.

It may be arranged that the glass rod is fixed to the cable holder by caulking an appropriate portion of the cable holder.

According to another aspect of the present invention, a discharge lamp device including a light distribution compound lens for forming a given light distribution, the light distribution compound lens comprising a first lens portion for condensing and irradiating light from a discharge lamp; and a second lens portion, provided at a side of the first lens portion closer to the discharge lamp, for deflecting the light from the discharge lamp in a given direction before the light is condensed by the first lens portion, wherein a curved surface of the second lens portion is given as a curved surface of a cylindrical lens, and wherein the cylindrical lens has an axis inclined by a given angle in one of left and right directions relative to a vertical direction and forms a slantly extending cutline light distribution depending on the inclination angle of the axis.

It may be arranged that the second lens portion is located below an optical axis of the light distribution compound lens.

It may be arranged that the light distribution compound lens further comprises a third lens portion, provided at the side of the first lens portion closer to the discharge lamp, for deflecting the light from the discharge lamp in a given direction before the light is condensed by the first lens portion, that a curved surface of the third lens portion is given as a curved surface of a cylindrical lens, and that the cylindrical lens has an axis set in the vertical direction and forms a flat light distribution spreading in a horizontal direction.

It may be arranged that the curved surface of the second lens portion further bends along the axis.

It may be arranged that an incidence plane of the third lens portion is formed by combining a plurality of curved surfaces having different radii of curvature, and that the radii of curvature of the plurality of curved surfaces are set smaller as located closer to a center portion of the third lens portion.

It may be arranged that an optical cable coupling assembly is further included for connecting together a housing with the discharge lamp therein and a synthetic resin optical cable composed of a core member and a clad member for transmitting the light emitted from the discharge lamp to the light distribution compound lens, the optical cable coupling assembly comprising a cable holder holding the synthetic resin optical cable and attached to the housing; and a glass rod inserted into the cable holder so as to abut an end surface of the synthetic resin optical cable and having a function of a heat cut filter, wherein a resin film having a refractive index smaller than that of the glass rod is provided on a surface of the glass rod, and wherein the glass rod is fixed to the cable holder via the resin film.

It may be arranged that the cable holder comprises a first cable holder holding the synthetic resin optical cable and the glass rod in a fixed fashion, and a second cable holder holding the first cable holder and attached to the housing.

It may be arranged that an outer diameter of the glass rod with the resin film provided thereon is set smaller than an outer diameter of the synthetic resin optical cable, and that an outer diameter of the glass rod is set equal to or smaller than an outer diameter of the core member of the synthetic resin optical cable.

It may be arranged that the glass rod is fixed to the cable holder by caulking an appropriate portion of the cable holder.

According to another aspect of the present invention, an optical cable coupling assembly for connecting together a housing with a light source therein and a synthetic resin optical cable composed of a core member and a clad member for transmitting light emitted from the light source to a given place, comprises a cable holder holding the synthetic resin optical cable and attached to the housing; and a glass rod inserted into the cable holder so as to abut an end surface of the synthetic resin optical cable and having a function of a heat cut filter, wherein a resin film having a refractive index smaller than that of the glass rod is provided on a surface of the glass rod, and wherein the glass rod is fixed to the cable holder via the resin film.

It may be arranged that the cable holder comprises a first cable holder holding the synthetic resin optical cable and the glass rod in a fixed fashion, and a second cable holder holding the first cable holder and attached to the housing.

It may be arranged that an outer diameter of the glass rod with the resin film provided thereon is set smaller than an outer diameter of the synthetic resin optical cable, and that an outer diameter of the glass rod is set equal to or smaller than an outer diameter of the core member of the synthetic resin optical cable.

It may be arranged that the glass rod is fixed to the cable holder by caulking an appropriate portion of the cable holder.

BRIEF DESCRIPTION OF THE DRAWINGS

The present invention will be understood more fully from the detailed description given hereinbelow, taken in conjunction with the accompanying drawings.

In the drawings:

FIG. 9 is a sectional view showing a main part of the optical cable coupling assembly shown in FIG. 8;

FIG. 10 is a sectional view showing a first modification of the third preferred embodiment;

FIG. 11 is a sectional view showing a second modification of the third preferred embodiment;

FIG. 12 is a sectional view showing a third modification of the third preferred embodiment;

DESCRIPTION OF THE PREFERRED EMBODIMENT

Now, preferred embodiments of the present invention will be described hereinbelow with reference to the accompanying drawings. Throughout the figures, the same marks or symbols represent the same or like members or element.

Figure 1:
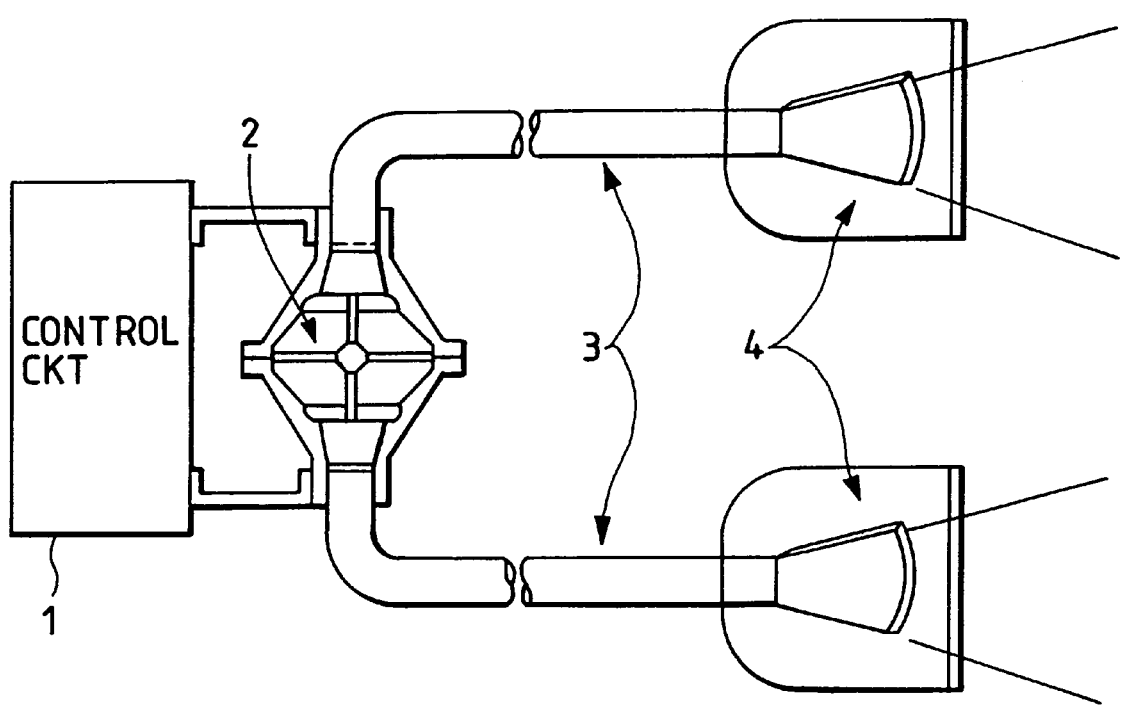
FIG. 1 is a diagram showing a schematic structure of a discharge lamp device according to preferred embodiments of the present invention.

FIG. 1 is a diagram showing a schematic structure of a discharge lamp device according to the preferred embodiments of the present invention. In the following preferred embodiments, the discharge lamp device is applied to a headlight arrangement of a vehicle (not shown).

Figure 8:
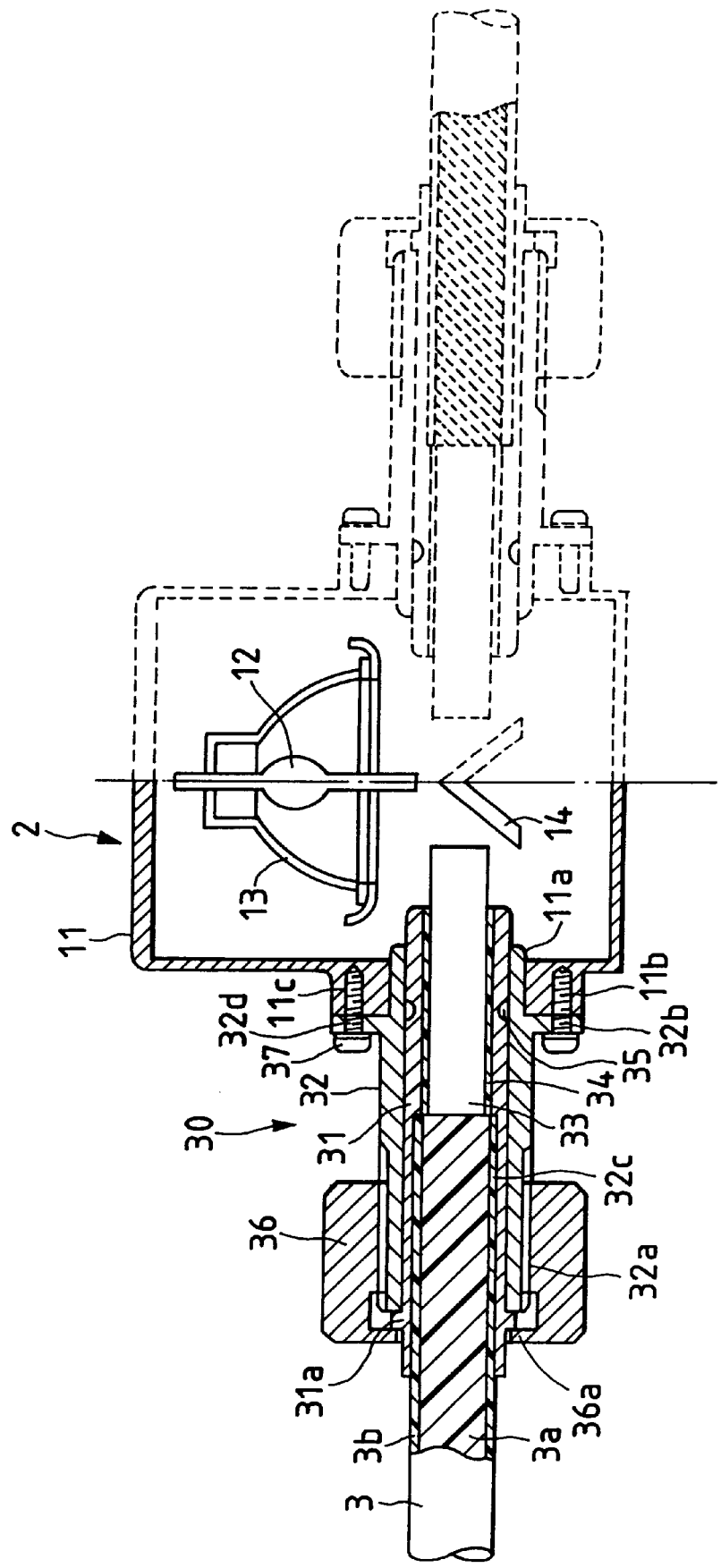
FIG. 8 is a sectional view showing an optical cable coupling assembly for coupling an optical cable to a light unit in the discharge lamp device shown in FIG. 1, according to a third preferred embodiment of the present invention.

In FIG. 1, a control circuit 1 controls an electric power supplied to a light unit 2. As shown in FIG. 8, the light unit 2 has a housing 11 which includes therein a light source 12 in the form of a discharge lamp in the preferred embodiments of the present invention. The light source 12 is disposed at a first focal point of a reflecting mirror or a reflector 13. The reflector 13 reflects the light emitted from the light source 12 so as to converge the reflected light onto a wedge-shaped reflecting mirror 14 which then reflects and distributes the light in left and right directions in FIG. 8.

At each of left and right side walls of the housing 11 is provided a boss portion 11b projecting outward from the corresponding side wall. The boss portion 11b is formed with an opening 11a for receiving therethrough a later-described glass rod 33 and first and second cable holders 31 and 32. The boss portion 11b is further formed with a plurality of screw holes 11c for mounting the second cable holder 32.

The light emitted from the light source 12 gets into optical cables 3, 3 which then transmit the received light to light distribution units 4, 4 arranged at the front left and right sides of the vehicle, respectively.

Now, the control circuit 1 shown in FIG. 1 will be described hereinbelow with reference to FIGS. 2 to 4 according to the first preferred embodiment of the present invention.

The basic concepts of this preferred embodiment will be first explained hereinbelow.

Figure 7:
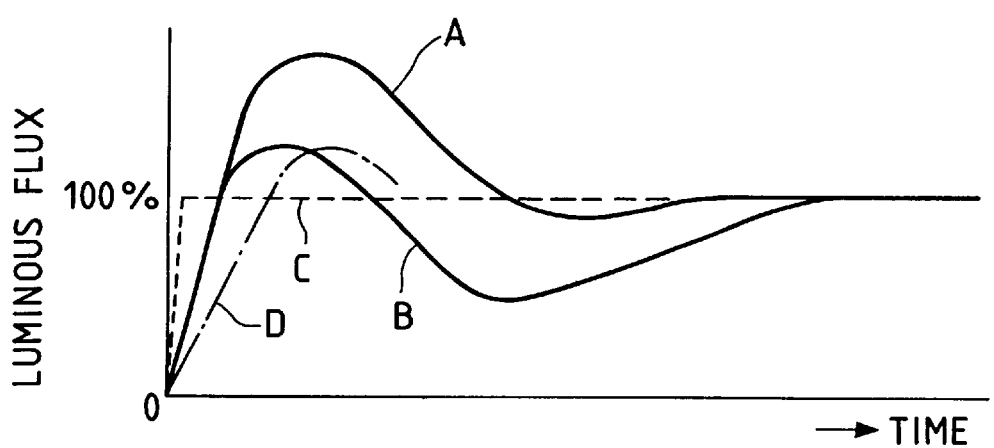
FIG. 7 is a time-domain diagram for explaining conventional problems relative to the first preferred embodiment.

An ideal build-up characteristic of luminous, flux (see C in FIG. 7) was experimentally realized by monitoring optical outputs from the discharge lamp and controlling the electric power applied to the discharge lamp so as to converge the optical output to a given constant value. During the experiment, characteristic data, such as lamp voltages and lamp currents, were measured corresponding to the lapse of time from the start of lighting of the discharge lamp. Thus, by performing a control simulating those characteristic data, the ideal build-up characteristic of luminous flux can be achieved.

The luminous flux is produced from a time point of the start of the lighting, increases with the lapse of time and then reaches 100%. From the experiment, it has been found that the lamp voltage takes an approximately constant value at a time point where the luminous flux reaches 100%. It has been further found that, in a region controlling the luminous flux to be flat after the luminous flux has reached 100%, a variation characteristic of the lamp current relative to the lapse of time can be approximated by a combination of two time constant curves from a time point where the luminous flux has reached 100% to a time point where the lamp current and the lamp voltage reach their stable states. Specifically, the variation characteristic of the lamp current can be approximated by a first time constant curve from the time point where the luminous flux has reached 100% to a time point after a lapse of constant time therefrom, and by a second time constant curve from the foregoing time point after the lapse of the constant time to the foregoing time point where the lamp current and voltage reach their stable states.

Thus, in this preferred embodiment, the lamp current is controlled to be held constant from the start of the lighting until the lamp voltage reaches a given value corresponding to the foregoing approximately constant value, then reduced as having a correlation with the first time constant curve for the constant time from the time point where the lamp voltage has reached the given value and then reduced as having a correlation with the second time constant curve after the lapse of the foregoing constant time, so that a stable lighting state is reached.

Now, referring to FIGS. 2 to 4, a structure of the control circuit 1 of the discharge lamp device will be described in detail hereinbelow according to the first preferred embodiment.

In FIG. 1, the discharge lamp 12 is connected to a battery 5 via a switch 6. A coil 7 is for applying a starting high voltage to the discharge lamp 12 upon starting it.

Lamp power feed means 100 is for supplying the electric power to the discharge lamp 12. The lamp power feed means 100 includes a PWM control circuit 101, a power transistor 102, a transformer 103, a rectifier diode 104 and a smoothing capacitor 105. The PWM control circuit 101 controls th(e power transistor 102 in an on-off fashion. The transformer 103 stores energy at the primary coil when the power transistor 102 is on, while discharges the stored energy to the secondary coil when the power transistor 102 is off. The rectifier diode 104 and the smoothing capacitor 105 rectify and smooth the voltage generated at the secondary coil of the transformer 103 when the power transistor 102 is off, so as to feed the power to the discharge lamp 12. As described, the lamp power feed means 100 is in the form of a general separately excited DC—DC converter.

Lamp voltage conversion means 200 outputs a constant current value free of a lamp voltage $V_L$ when the lamp voltage $V_L$ is lower than a later-described second given voltage value or when the lamp voltage $V_L$ is no less than a later-described third given voltage value. On the other hand, the lamp voltage conversion means 200 outputs a value having a correlation with the lamp voltage $V_L$ when the lamp voltage $V_L$ is no less than the second given voltage value and less than the third given voltage value. The second given voltage value is set greater than a later-described first given voltage value and lower than a value of the lamp voltage $V_L$ in the stable lighting state of the discharge lamp 12.

An igniter circuit 300 generates a high voltage at the coil 7 upon the start-up of the discharge lamp 12 and, when the discharge lamp 12 has been started, it stops the generation of the high voltage at the coil 7.

Lamp current detection means 400 outputs a value proportional to a lamp current $I_L$.

Power control means 500 determines and controls a magnitude of the power applied to the discharge lamp 12. Specifically, the power control means 500 derives a power control signal from the output signals from the lamp voltage conversion means 200 and the lamp current detection means 400 and outputs it to the PWM control circuit 101 of the lamp power feed means 100. In response to the power control signal, the PWM control circuit 101 on-off controls the power transistor 102, that is, controls a duty cycle (on-off duty) of the power transistor 102, so that the power supplied to the discharge lamp 12 is controlled.

Figure 3:
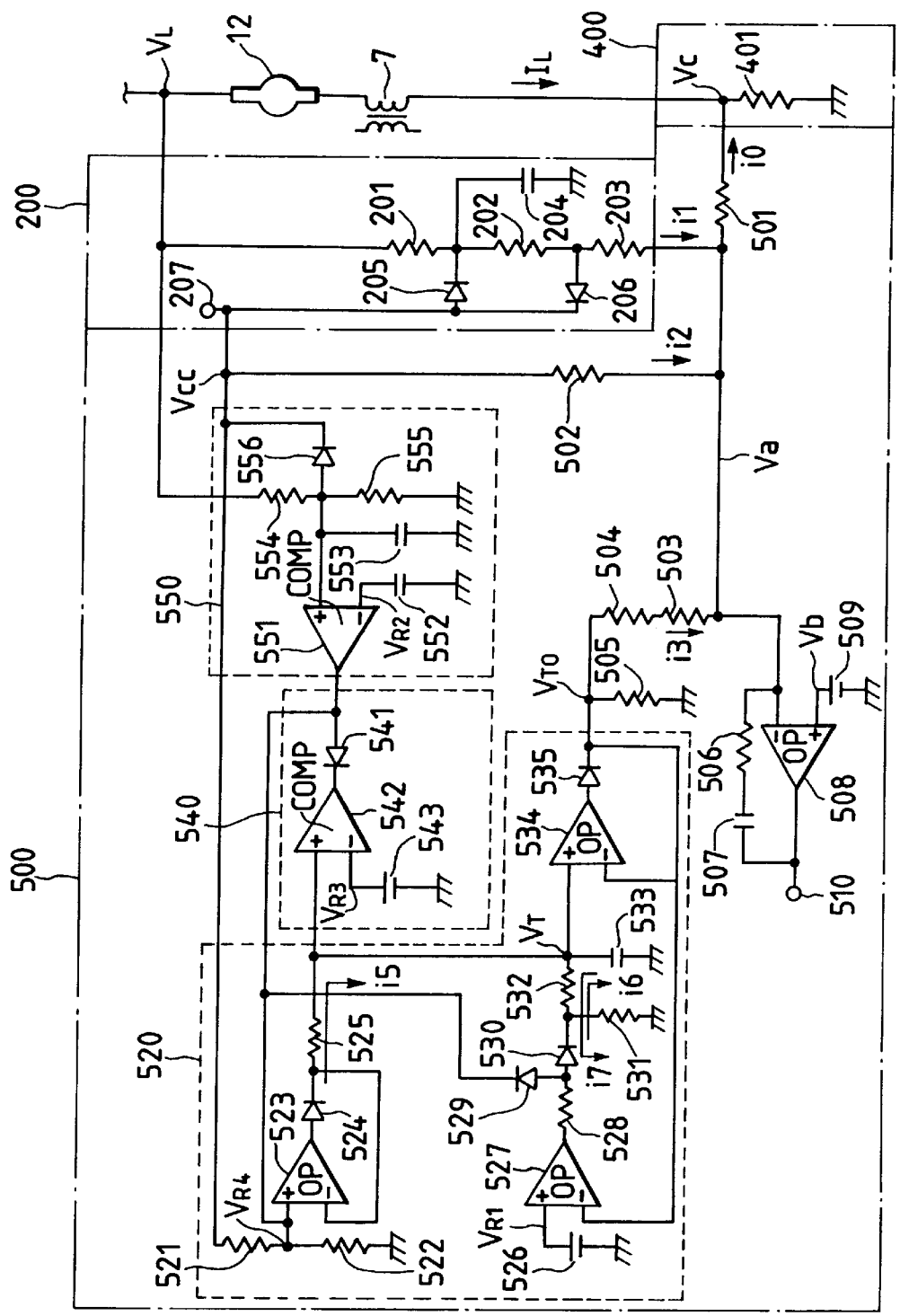
FIG. 3 is a circuit diagram showing detailed structures of lamp voltage conversion means, lamp current detection means and power control means of the control circuit shown in FIG. 2.

FIG. 3 is a circuit diagram showing detailed structures of the lamp voltage conversion means 200, the lamp current detection means 400 and the power control means 500.

In FIG. 3, the lamp voltage conversion means 200 includes resistors 201~203, a noise removing capacitor 204 and clamping diodes 205 and 206. A terminal 207 is connected to a constant voltage source (not shown).

The lamp current detection means 400 includes a resistor 401 and detects the lamp current $I_L$ passing through the resistor 401 as a voltage value.

The power control means 500 includes resistors 501~505 and an error amplifier constituted by a resistor 506, a capacitor 507, an operational amplifier 508 and a reference voltage source 509. The foregoing power control signal is outputted through an output terminal 510 of the error amplifier and inputted into the PWM control circuit 101 (FIG. 1).

The power control means 500 further includes a time constant circuit 520. The time constant circuit 520 includes resistors 521 and 522, an operational amplifier 523, a diode 524, a resistor 525, a reference voltage source 526, an operational amplifier 527, a resistor 528, a clamping diode 529, a diode 530, resistors 531 and 532, a capacitor 533, an operational amplifier 534 and a diode 535. A first time constant curve is prepared by charging the capacitor 533 via two charging paths i5 and i6 (charging currents), while a second time constant curve is prepared by charging the capacitor 533 via the charging path i6 only. In FIG. 3, i7 represents a discharging path (discharging current) of the capacitor 533.

The power control means 500 further includes a mask circuit 540. The mask circuit 540 includes a diode 541, a comparator 542 and a reference voltage source 543. As will be described later, the mask circuit 540 compares a charged voltage $V_T$ of the capacitor 533 with a reference voltage $V_{R3}$ of the reference voltage source 543 so as to produce a mask output for a given constant time.

The power control means 500 further includes a lamp voltage detection circuit 550. The lamp voltage detection circuit 550 includes a comparator 551, a reference voltage source 552, a noise removing capacitor 553, voltage dividing resistors 554 and 555, and a clamping diode 556. The lamp voltage detection circuit 550 detects whether the lamp voltage $V_L$ is no less than the foregoing first given voltage value or not, and outputs a result of the detection. When the lamp voltage $V_L$ reaches the first given voltage value, the luminous flux of the discharge lamp 12 reaches 100%. The operational amplifiers 508, 523, 527 and 534 and the comparators 542 and 551 are fed with the power from the battery 5 or a constant voltage source (not shown).

Now, an operation of the control circuit 1 having the foregoing structure will be described hereinbelow.

When the switch 6 is turned on, the lamp power feed means 100 is operated to apply the lamp voltage $V_L$ of about 300 V to the discharge lamp 12, and the igniter circuit 300 is operated to generate a high voltage at the coil 7 which is also applied to the discharge lamp 12. Due to the applied high voltage, a breakdown is caused between electrodes of the discharge lamp 12 so that electric charge of the capacitor 105 is discharged through the discharge lamp 12 as a lamp current $I_L$ and thus the discharge lamp 12 starts lighting. After the breakdown of the discharge lamp 12, the igniter circuit 300 stops its operation so that the generation of the high voltage at the coil 7 is also stopped. After the start of the lighting of the discharge lamp 12, the applied power to the discharge lamp 12 is controlled by the power control means 500 via the lamp power feed means 100.

Now, a control of the power applied to the discharge lamp 12 will be described hereinbelow.

Figure 2:
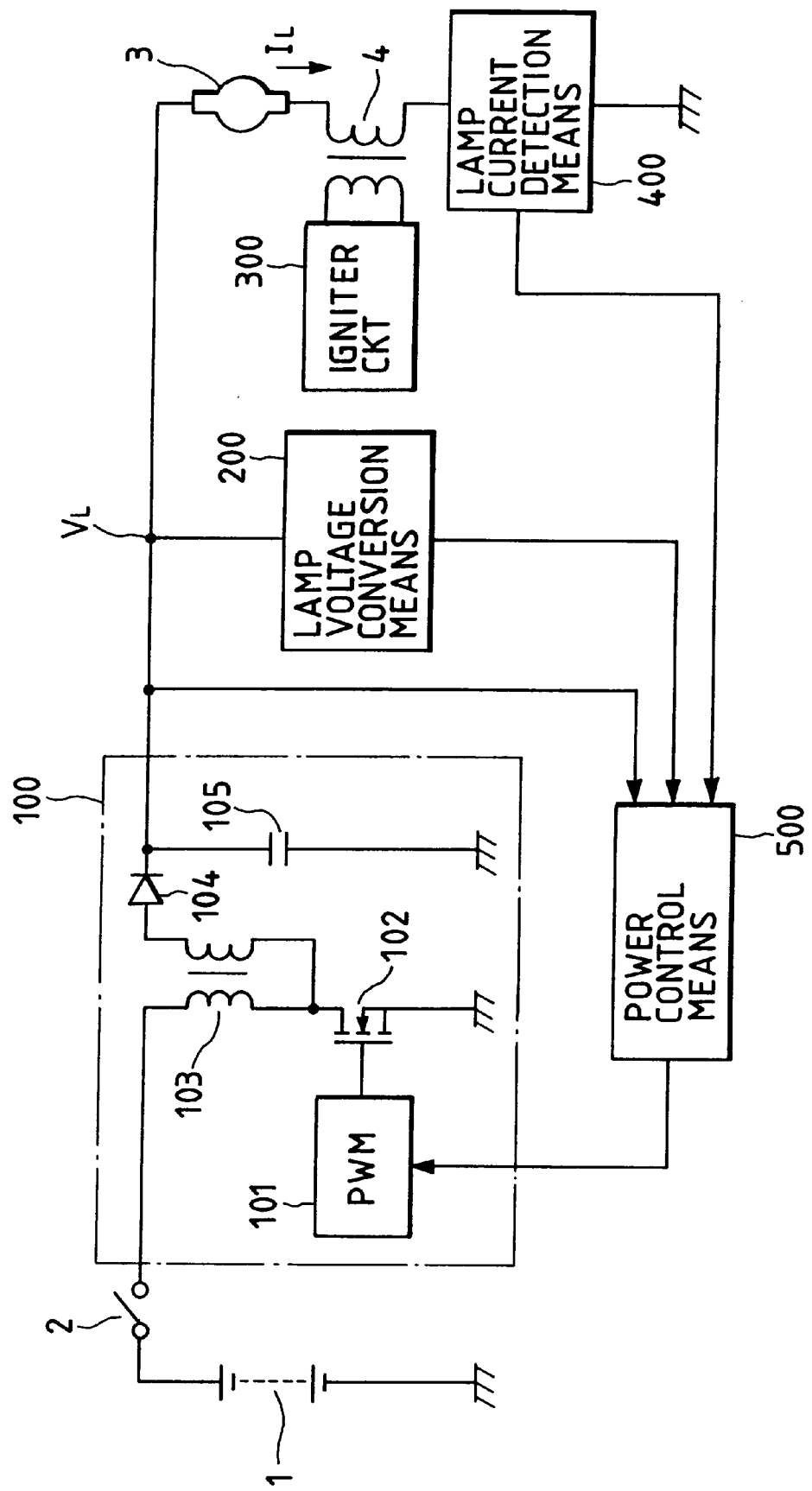
FIG. 2 is a diagram showing a structure of a control circuit, with a discharge lamp included in the circuit, of the discharge lamp device shown in FIG. 1, according to a first preferred embodiment of the present invention.

In FIGS. 2 and 3, while the discharge lamp 12 is lit, the PWM control circuit 101 controls the power applied to the discharge lamp 12 based on the power control signal from the output terminal 510 such that a voltage Va at an inverting input terminal of the operational amplifier 508 is held equal to a reference voltage Vb at a noninverting input terminal thereof, that is, Va≈Vb. The voltage Va is determined as represented by an equation (1) as follows:

$$Va=(i1+i2+i3) \times R_{501}+I_L \times R_{401}=i0 \times R_{501}+V_c \qquad (1)$$

wherein i1 represents an output current of the lamp voltage conversion means 200, i2 a constant current determined by a resistance value of the resistor 502, i3 a current determined by an output voltage $V_{TO}$ of the time constant circuit 520 and resistance values of the resistors 503~505, $R_{401}$ a resistance value of the resistor 401, $R_{501}$ a resistance value of the resistor 501 and Vc a detected voltage across the resistor 401, and wherein $R_{501} \gg R_{401}$.

In the foregoing equation (1), when the lamp voltage $V_L$ is below the foregoing second given voltage value (a lamp voltage value where the diode 205 starts a clamping operation), the current i1 is given by:

$$i1 = (V_{cc} - V_{F205} - V_a)/(R_{202} + R_{203}) \quad (2)$$

wherein $V_{F205}$ represents a forward voltage drop across the diode 205, $R_{202}$ a resistance value of the resistor 202 and $R_{203}$ a resistance value of the resistor 203, so that the current i1 takes a constant current value free of the lamp voltage $V_L$.

On the other hand, when the lamp voltage $V_L$ is no less than the foregoing second given voltage value and below the foregoing third given voltage value (a lamp voltage value where the diode 206 starts a clamping operation), the current i1 is given by:

$$i1 = (V_L - V_a)/(R_{201} + R_{202} + R_{203}) \quad (3)$$

wherein $R_{201}$ represents a resistance value of the resistor 201, so that the current i1 takes a current value having a correlation with the lamp voltage $V_L$.

Further, when the lamp voltage $V_L$ is no less than the foregoing third given voltage value, the current i1 is given by:

$$i1 = (V_{cc} + V_{F206} - V_a)/R_{203} \quad (4)$$

so that the current i1 takes a constant current value free of the lamp voltage $V_L$.

On the other hand, the current i2 is given by:

$$i2 = (V_{cc} - V_a)/R_{502} \quad (5)$$

wherein $R_{502}$ represents a resistance value of the resistor 502, so that the current i2 takes a constant current value.

On the other hand, the current i3 changes depending on the output voltage $V_{TO}$ of the time constant circuit 520 and is given by the following equation (6) in a region where the charged voltage $V_T$ of the capacitor 533 of the time constant circuit 520 is below the voltage $V_a$ at the inverting input terminal of the operational amplifier 508:

$$i3 = -V_a/(R_{503} + R_{504} + R_{505}) \quad (6)$$

wherein $R_{503}$ represents a resistance value of the resistor 503, $R_{504}$ a resistance value of the resistor 504 and $R_{505}$ a resistance value of the resistor 505.

On the other hand, when the charged voltage $V_T$ is in a region where $V_T \geq V_a$, the output voltage $V_{TO}$ of the time constant circuit 520 is equal to $V_T$ ($V_{TO} = V_T$) and the current i3 is given by:

$$i3 = (V_{TO} - V_a)/(R_{503} + R_{504}) \quad (7)$$

Now, operations of the time constant circuit 520, the mask circuit 540 and the lamp voltage detection circuit 550 will be described hereinbelow with reference to FIG. 4.

When the switch 6 is turned on (timing A in FIG. 4), the power control circuit 500 is started. Thus, the lamp voltage $V_L$ of about 300 V is applied to the discharge lamp 12 (timings A~B). When the high voltage is generated at the coil 7 (timing B), the discharge lamp 12 causes the breakdown so that the lamp current $I_L$ flows through the discharge lamp 12 to start lighting the discharge lamp 12. Immediately after the breakdown (timings B~C) of the discharge lamp 12, the lamp voltage $V_L$ temporarily takes an intermediate value and then shifts to a lower value as shown in FIG. 4.

The capacitor 533 starts charging from timing A. Specifically, the capacitor 533 is charged by the charging current i6 determined by the resistor 532 so that the charged voltage $V_T$ increases with the lapse of time. Until the charged voltage $V_T$ of the capacitor 533 reaches the reference voltage $V_{R3}$ of the reference voltage source 543 of the mask circuit 540, a voltage $V_{R4}$ at a noninverting input terminal of the operational amplifier 523 is held at a low level due to the comparator 542 and the diode 541. Thus, the charging current i5 for charging the capacitor 533 does not flow through the resistor 525.

Thereafter, when the charged voltage $V_T$ of the capacitor 533 reaches the reference voltage $V_{R3}$ of the reference voltage source 543 of the mask circuit 540 (timing D), the output of the comparator 542 of the mask circuit 540 is inverted to a high level so that the mask function is released. At this time point, however, the lamp voltage $V_L$ is in the lowest voltage state where the lamp voltage $V_L$ is lower than a lamp voltage detection level of the lamp voltage detection circuit 550. Specifically, a voltage at a noninverting input terminal of the comparator 551 is below a reference voltage $V_{R2}$ of the reference voltage source 552.

Accordingly, the comparator 551 holds the voltage $V_{R4}$ at the noninverting input terminal of the operational amplifier 523 at the low level so that the capacitor 533 is charged only by the charging current i6 (timings D~E).

Then, when the lamp voltage $V_L$ increases, to reach the reference voltage $V_{R2}$ (the foregoing first given voltage value) of the reference voltage source 552 of the lamp voltage detection circuit 550 (timing E), the output of the comparator 551 is inverted to a high level so that the voltage $V_{R4}$ at the noninverting input terminal of the operational amplifier 523 takes a voltage value determined by the resistors 521 and 522. Thus, the charging current i5 is fed to the capacitor 533 via the operational amplifier 523, the diode 524 and the resistor 525 so that the capacitor 533 is charged with the charging currents i5 and i6.

Thereafter, when the charged voltage $V_T$ of the capacitor 533 reaches the voltage $V_{R4}$ at the noninverting input terminal of the operational amplifier 523 (timing F), no charging current i5 flows any more so that the capacitor 533 is charged only by the charging current i6.

Subsequently, when the charged voltage $V_T$ of the capacitor 533 reaches a reference voltage $V_{R1}$ of the reference voltage source 526 (timing G), the charged voltage $V_T$ is held at the reference voltage $V_{R1}$ thereafter.

Figure 4:
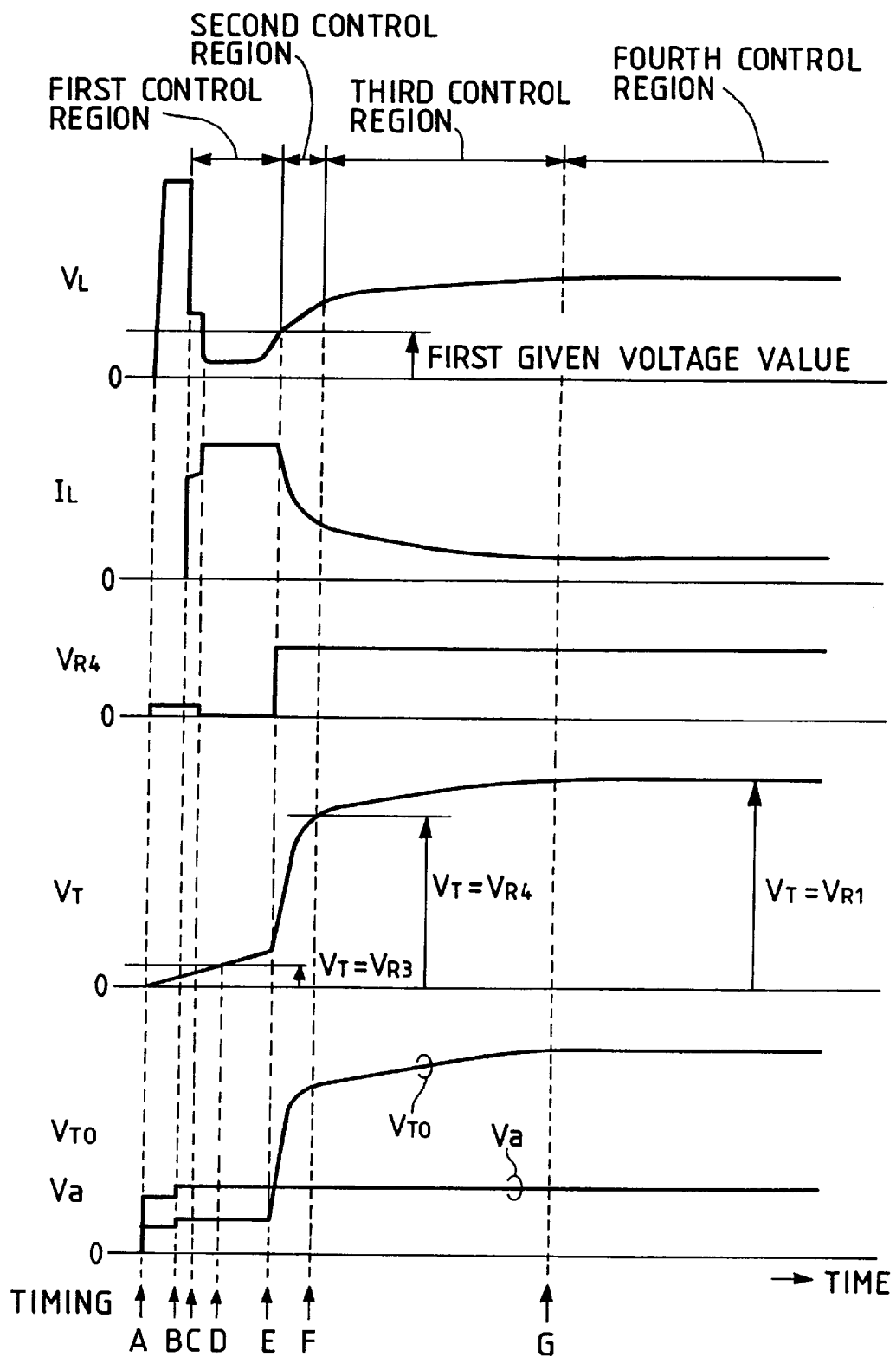
FIG. 4 is a time-domain diagram for explaining an operation of the control circuit according to the first preferred embodiment.

Through the foregoing operations, the lamp current $I_L$ is controlled to have the waveform as shown in FIG. 4.

As described above, even if the lamp voltage $V_L$ exceeds the first given voltage value in the period from timing A to timing C, since the mask period of the mask circuit 540 is from timing A to timing D, the charging of the capacitor 533 with the charging current i5 is prohibited.

The period from timing B to timing E is a period from the start of the lighting of the discharge lamp 12 to the time point where the lamp voltage $V_L$ reaches the first given voltage value, and corresponds to a first control region where the lamp current $I_L$ is controlled to be held constant. As appreciated, in the period from timing B to timing C, the power control means 500 is operated so as to control the lamp current $I_L$ at a constant current value as in the period from timing C to timing E. However, due to insufficiency in capability of the power supply of the lamp power feed means 100, the lamp current $I_L$ is limited and controlled at a smaller constant current value.

The period from timing E to timing F corresponds to a second control region where the capacitor 533 is charged by a charging curve, that is, the first time constant curve, determined by magnitudes of the charging currents i5 and i6 of the capacitor 533 and a capacitance value of the capacitor 533. Accordingly, the period from timing E to timing F is constant. In the period from timing E to timing F, a control in the region of the lamp voltage $V_L$ being below the second given voltage value and a control in the region of the lamp voltage $V_L$ being no less than the second given voltage value differ from each other as follows. It is possible that the lamp voltage $V_L$ does not reach the second given voltage value in the period from timing E to timing F.

(1) Control in Region of $V_L$ below Second Given Voltage Value

As described before, the output current i1 of the lamp voltage conversion means 200 takes a constant current value in the region of the lamp voltage $V_L$ being below the second given voltage value. Accordingly, in this region, the power applied to the discharge lamp 12 is controlled to a value determined by the current i3 proportional to a variation of the output voltage $V_{TO}$ (first time constant curve) of the time constant circuit 520, the constant currents i1 and i2 and the lamp current $I_L$.

(2) Control in Region of $V_L$ no less than Second Given Voltage Value

As described before, the output current i1 of the lamp voltage conversion means 200 takes a current value proportional to the lamp voltage $V_L$ in the region of the lamp voltage $V_L$ being no less than the second given voltage value. Accordingly, in this region, the power applied to the discharge lamp 12 is controlled to a value determined by the current i3 proportional to a variation of the output voltage $V_{TO}$ (first time constant curve) of the time constant circuit 520, the current i1 proportional to a variation of the lamp voltage $V_L$, the constant current i2 and the lamp current $I_L$.

The period from timing F to timing G corresponds to a third control region where the capacitor 533 is charged by a charging curve, that is, the second time constant curve, determined by a magnitude of the charging current i6 of the capacitor 533 and the capacitance value of the capacitor 533. Accordingly, the period from timing F to timing G is also constant. The control in the period from timing F to timing G is the same as that of the foregoing second control region depending on whether the lamp voltage $V_L$ is below or no less than the second given voltage value. Specifically, in the region of the lamp voltage $V_L$ being below the second given voltage value, the power applied to the discharge lamp 12 is controlled to a value determined by the current i3 proportional to a variation of the output voltage $V_{TO}$ (second time constant curve) of the time constant circuit 520, the constant currents i1 and i2 and the lamp current $I_L$. On the other hand, in the region of the lamp voltage $V_L$ being no less than the second given voltage value, the power applied to the discharge lamp 12 is controlled to a value determined by the current i3 proportional to a variation of the output voltage $V_{TO}$ (second time constant curve) of the time constant circuit 520, the current i1 proportional to a variation of the lamp voltage $V_L$, the constant current i2 and the lamp current $I_L$. It is to be noted that, even if the lamp voltage $V_L$ does not reach the second given voltage value in the second control region, the second given voltage value is set to a value which is reached bar the lamp voltage $V_L$ without fail in the third control region.

The region subsequent to timing G corresponds to a fourth control region where the discharge lamp 12 is in the stable lighting state. In the fourth control region, the output voltage $V_{TO}$ of the time constant circuit 520 is controlled at the reference voltage $V_{R1}$ of the reference voltage source 526 so that the current i3 takes a constant current value regardless of the lapse of time. Thus, in the fourth control region, the power is controlled to a value determined by the constant currents i2 and i3, the current i1 proportional to a variation of the lamp voltage $V_L$, and the lamp current $I_L$.

As appreciated, if the lamp voltage $V_L$ does, not reach the foregoing first given voltage value in the first control region, the lamp current $I_L$ is controlled to be constant for a given time from the start of the lighting (timings B~E), that is, from the start of the lighting and before the charged voltage $V_T$ of the capacitor 533 reaches the voltage Va at the inverting input terminal of the operational amplifier 508, and thereafter, the lamp current $I_L$ is controlled to be reduced gradually with the lapse of time so as to shift to the foregoing fourth control region.

As appreciated from the foregoing description, in this preferred embodiment, the lamp current is controlled to be constant from the start of the lighting and until the luminous flux reaches 100% (that is, until the lamp voltage reaches the first given voltage value), then the lamp current is approximated by the first time constant curve from the time point where the luminous flux reaches 100% to the time point of the lapse of the given constant time therefrom, and then the lamp current is approximated by the second time constant curve from the time point of the lapse of the given constant time to the time point where the discharge lamp 12 reaches the stable lighting state. Through such a control, the ideal build-up characteristic of the luminous flux (see C in FIG. 7) can be reproduced, wherein the luminous flux is built up in a short time from the start of the lighting and an occurrence of overshoot or undershoot is minimized to a possible extent so as to achieve the approximately flat build-up characteristic of the luminous flux. This renders the discharge lamp device suitable for the vehicular headlight arrangement.

Further, in general, the lamp voltage $V_L$ increases to the high level greater than the foregoing first given voltage value immediately after the energization of the discharge lamp device, that is, immediately after the switch 6 is turned on, as shown in FIG. 4.

Thus, the lamp voltage detection circuit 550 misjudges that the luminous flux of the discharge lamp 12 has reached 100%, due to the high level of the lamp voltage $V_L$ immediately after the energization. In this preferred embodiment, however, since the mask circuit 540 is provided to nullify such a misjudgment, it is prevented that the control after the start of the lighting is started from the second control region, omitting the control in the first control region.

Now, an operation will be described, wherein the switch 6 is turned off after the lighting of the discharge lamp 12.

When the switch 6 is turned off, the operation of the circuit is stopped so that the power supply to the discharge lamp 12 is also stopped to light out the discharge lamp 12. In the light-out state, the electric charge of the capacitor 533 of the time constant circuit 520 is discharged through the resistors 532 and 531 as the discharging current i7. A discharge time constant upon such discharge is set based on a temperature variation of the discharge lamp 12 relative to the lapse of time after the light-out of the discharge lamp 12, and hence set to about several tens of seconds. Accordingly, it is possible that the electric charge remains at the capacitor 533 upon turning on the switch 6 again. In this case, the time constant circuit 520 operates with the voltage across the capacitor 533 as an initial value. Thus, the power control is performed depending on a magnitude of the time from the light-out of the discharge lamp 12 to the re-lighting thereof, that is, depending on the temperature of the discharge lamp 12, so that the overshoot of the optical output of the discharge lamp 12 can be prevented to achieve a build-up characteristic of the optical output which is approximately flat.

Figure 5:
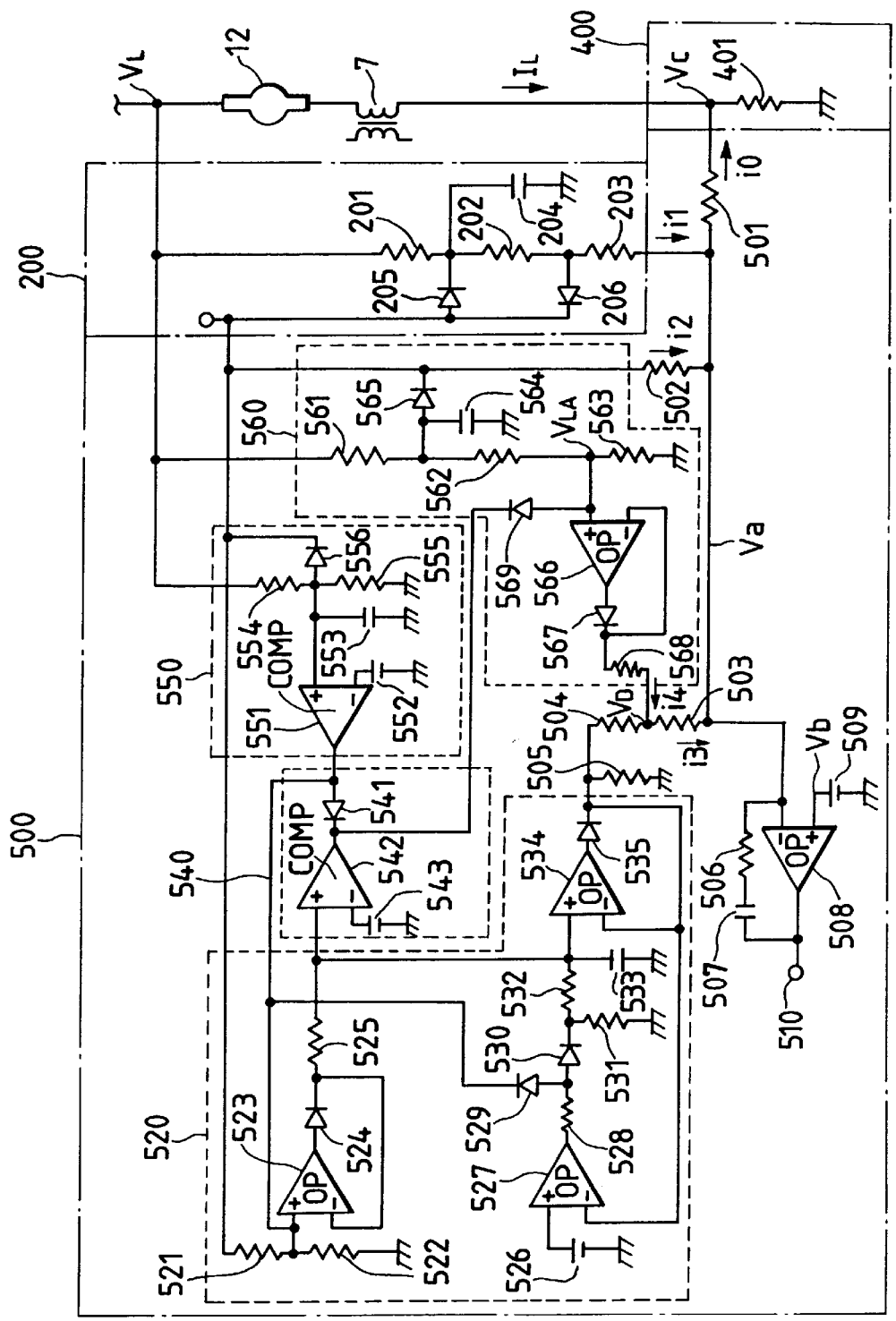
FIG. 5 is a circuit diagram showing detailed structures of lamp voltage conversion means, lamp current detection means and power control means of a control circuit shown in FIG. 2, according to a second preferred embodiment of the present invention.

FIG. 5 is a circuit diagram showing detailed structures of lamp voltage conversion means 200, lamp current detection means 400 and power control means 500 of the control circuit 1 shown in FIG. 2, according to the second preferred embodiment of the present invention.

The second preferred embodiment differs from the first preferred embodiment only in that the power control means 500 is provided with a power correction circuit 560. The other structure is the same as that of the first preferred embodiment.

The power correction circuit 560 includes resistors 561~563, a noise removing capacitor 564, a clamping diode 565, an operational amplifier 566, a rectifier diode 567, a resistor 568 and a diode 569. The resistor 561 is connected to a positive terminal of the discharge lamp 12, and the resistor 568 is connected between the resistors 503 and 504. Further, a cathode of the diode 569 is connected to the output terminal of the comparator 542 of the mask circuit 540.

Now, an operation of the power correction circuit 560 will be described hereinbelow.

The lamp voltage $V_L$ is divided through the resistors 561~563, and a divided voltage $V_{LA}$ is inputted to a noninverting input terminal of the operational amplifier 566. If the divided voltage $V_{LA}$ is lower than a voltage $V_D$ between the resistors, 503 and 504, an output current i4 of the power correction circuit 560 becomes zero.

On the other hand, if the divided voltage $V_{LA}$ is greater than the voltage $V_D$, the output current i4 is caused to flow. In this preferred embodiment, it is set that $V_{LA}$ becomes less than $V_D$ ($V_{LA}<V_D$) while the discharge lamp 12 is in the stable lighting state, FIG. 6 is a diagram showing an example of the divided voltage $V_{LA}$, the voltage $V_D$ and the lamp current $I_L$ relative to the lapse of time from the start of the lighting.

Figure 6:
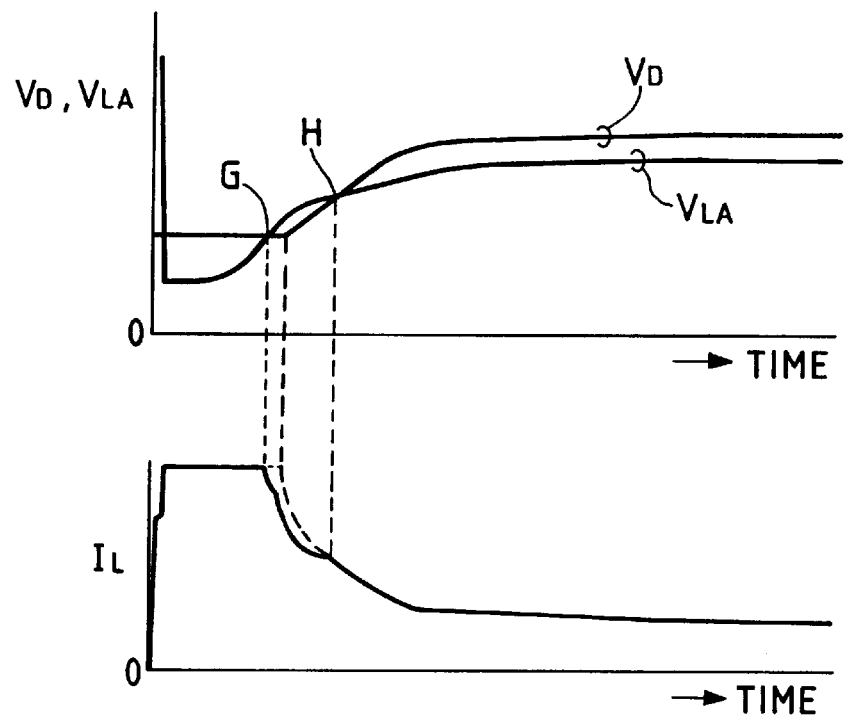
FIG. 6 is a time-domain diagram for explaining an operation of the control circuit according to the second preferred embodiment.

In FIG. 6, in a period from point G to point H where the divided voltage $V_{LA}$ is greater than the voltage $V_D$, the output current i4 is caused to flow. The output current i4 is represented by the following equation (8):

$$i4=(V_{LA}-V_D)/R568 \qquad (8)$$

wherein R568 represents a resistance value of the resistor 568.

By means of the output current i4, the power applied to the discharge lamp 12 is controlled to be reduced corresponding to a magnitude of the output current i4 so that the lamp current $I_L$ takes the waveform as shown by the solid line in FIG. 6. As appreciated, the waveform of the lamp current $I_L$ shown by the broken line in FIG. 6 is obtained when i4=0.

Through the foregoing operations, the optical output of the discharge lamp 12 can be controlled to be more approximate to flat.

Specifically, in general, the lamp voltage of the discharge lamp is built up faster upon re-lighting thereof (in case the discharge lamp is re-lit with a lapse of a relatively short time after the light-out and thus is not fully cooled) than upon cold starting thereof (in case the discharge lamp is fully cooled), and produces the large luminous flux. Thus, in this preferred embodiment, the power correction circuit 560 is provided for correcting the electric power applied to the discharge lamp 12 based on the lamp voltage $V_L$. Specifically, when the lamp voltage (the divided voltage $V_{LA}$ in this preferred embodiment) exceeds the given voltage value (the value of the voltage $V_D$ in this preferred embodiment), the output current i4 is caused to flow so that the electric power applied to the discharge lamp 12 is reduced depending on the output current i4 (the divided voltage $V_{LA}$) only in the foregoing first to third control regions so as to prevent generation of the large luminous flux upon the re-lighting.

Further, in general, the divided voltage $V_{LA}$ exceeds the voltage $V_D$ immediately after the energization of the discharge lamp device, that is, immediately after the switch 6 is turned on, so that the electric power applied to the discharge lamp 12 would be reduced due to the operation of the power correction circuit 560 without the provision of the mask circuit 540. However, in this preferred embodiment, since the mask circuit 540 is provided to forcibly achieve $V_{LA}<V_D$ via the diode 569 in the period from timing A to timing D, such reduction of the electric power is prohibited in that period so that the electric power can be properly supplied to the discharge lamp 12 even immediately after the energization of the discharge lamp device.

Now, the third preferred embodiment of the present invention will be described hereinbelow with reference to FIGS. 8 and 9. FIG. 8 is a sectional view showing a pair of optical cable coupling assemblies 30, 30 for coupling the optical cables 3, 3 to the light unit 2 in the discharge lamp device shown in FIG. 1. In FIG. 8, only one of the optical cable coupling assemblies is shown in solid line while the other is shown in broken line for brevity since both have the same structure. FIG. 9 is a sectional view showing a main part of the optical cable coupling assembly 30 shown in FIG. 8.

As described before with reference to FIG. 1, the light unit 2 has the housing 11 which includes therein the discharge lamp 12. The discharge lamp 12 is disposed at the first focal point of the reflector 13. The reflector 13 reflects the light emitted from the discharge lamp 12 so as to converge the reflected light onto the wedge-shaped reflecting mirror 14 which then reflects and distributes the light in the left and right directions in FIG. 8. At each of the left and right side walls of the housing 11 is provided the boss portion 11b projecting outward from the corresponding side wall. The boss portion 11b is formed with the opening 11a for receiving therethrough the glass rod 33 and the first and second cable holders 31 and 32. The boss portion 11b is further formed with a plurality of the screw holes 11c for mounting the second cable holder 32.

The optical cable 3 is composed of a core member 3a and a clad member 3b. The core member 3a is made of synthetic resin, such as silicon resin (refractive index: 1.47~1.49) or acrylic resin (refractive index: 1.49) each having the excellent light transmittance, or a fiber bundle of silicon resin or acrylic resin. The clad member 3b is made of fluororesin (refractive index: 1.30) or the like having a refractive index smaller than the core member 3a. Since the clad member 3b is smaller than the core member 3a in refractive index, the incident light entering the core member 3a of the optical cable 3 makes a total reflection at an interface between the core member 3a and the clad member 3b and is conducted to the corresponding light distribution unit 4 (see FIG. 1) without causing an optical loss.

The optical cable coupling assembly 30 is constituted by the first cable holder 31 made of metal and holding the optical cable 3, the second cable holder 32 made of metal, holding the first cable holder 31 and fixed to the boss portion 11b of the housing 11, the glass rod 33 inserted into the first cable holder 31 and conducting the reflected light from the wedge-shaped reflecting mirror 14 to the optical cable 3, a resin film 34 coating the glass rod 33, and a metal nut 36 having a stopper 36a which fixes the first and second cable holders 31 and 32 to each other.

Since the glass rod 33 is small in thermal conductivity among various materials which can transmit the light, it works as an excellent heat cut filter. As the resin film 34, for example, a fluororesin tube (refractive index: 1.30) having a refractive index smaller than the glass rod (refractive index: 1.51) and made of the same material as the clad member 3b is used and attached onto the glass rod 33 by means of press fitting or heat contraction. The glass rod 33 is exposed to the discharge lamp 12 at an end surface and an end circumference thereof so as to receive or take in the light therefrom. The resin film 34 is only applied onto the circumference of the glass rod 33 locating within the first cable holder 31.

As shown in FIG. 9, the first cable holder 31 is formed with an annular flange 31a on its outer periphery at an axial end portion thereof at the side of the optical cable 3 (left in FIG. 9). Further, the first cable holder 31 is formed on its inner periphery with a first through hole 31b having a diameter equal to an outer diameter φ1 of the optical cable 3, and a second through hole 31c having a diameter equal to an outer diameter φ3 of the glass rod 33 coated with the resin film 34. A step portion α is formed between the first and second through holes 31b and 31c.

The second cable holder 32 is formed on its outer periphery with a male screw portion 32a at an end portion thereof at the side of the optical cable 3 (left in FIG. 9) and with a flange 32b provided with screw holes 32d at an axial end portion thereof at the side of the light unit 2 (right in FIG. 9). Further, the second cable holder 32 is formed therethrough with a through hole 32c having a diameter equal to an outer diameter φ5 of the first cable holder 31.

The outer diameter φ3 of the glass rod 33 coated with the resin film 34 is set smaller than the outer diameter φ1 of the optical cable 3. An outer diameter φ4 of the glass rod 33 is set equal to or smaller than an outer diameter φ2 of the core member 3a of the optical cable 3.

Now, an operation of mounting the optical cable coupling assembly 30 having the foregoing structure will be described hereinbelow.

First, the optical cable 3 is inserted into the first cable holder 31 until the tip of the optical cable 3 reaches the step portion α between the first and second through holes 31b and 31c. Then, the glass rod 33 coated with the resin film 34 is inserted into the first cable holder 31 until the axial end of the glass rod 33 reaches the inserted optical cable 3. Then, the first cable holder 31 is caulked at an appropriate portion 35 so that the glass rod 33 coated with the resin film 34 is integrally fixed to the optical cable 3 via the first cable holder 31.

Subsequently, the nut 36 and the second cable holder 32 are fitted over the first cable holder 31 fixing the optical cable 3 and the glass rod 33 together as described above. Then, by rotating the nut 36 while engaging with the male screw portion 32a of the second cable holder 32, the annular flange 31a of the first cable holder 31 is firmly held between the stopper 36a of the nut 36 and the axial end of the second cable holder 32 so that the first cable holder 31 is fixed to the second cable holder 32.

After fixing together the optical cable 3, the glass rod 33 and the first and second cable holders 31 and 32 as described above, the glass rod 33 and the first and second cable holders 31 and 32 are partly inserted into the housing 11 through the opening 11a of the boss portion 11b until the flange 32b of the second cable holder 32 abuts the boss portion 11b, and then screws 37 are inserted into the screw holes 32d of the flange 32b and further threaded into the screw holes 11c of the boss portion 11b. In this fashion, the optical cable 3 is fixedly connected to the housing 11 of the light unit 2 via the glass rod 33.

In this preferred embodiment having the foregoing structure, the glass rod 33 having the heat cut filter function is provided at the axial end of the optical cable 3. Accordingly, the direct heat or the radiation heat from the discharge lamp 12 is intercepted by the glass rod 33 and thus prevented from being transmitted to the optical cable 3. Thus, the optical cable 3 can be free of being softened or deformed due to the heat so that the dislocation of the optical axis can be prevented and hence the object can be lightened with the required illuminance.

Further, the resin film 34 made of the fluororesin (refractive index: 1.30) having the smaller refractive index than the glass rod 33 is provided on the surface of the glass rod 33 (refractive index: 1.51). Accordingly, the incident light entering the glass rod 33 from the discharge lamp 12 makes the total reflection at the interface between the glass rod 33 and the resin film 34 so as to enter the optical cable 3. Thus, the incident light entering the glass rod 33 is prevented from leaking to the exterior so that the utilization efficiency and the transmission efficiency of the light are improved.

Further, the optical cable 3 and the glass rod 33 are fixed together by means of the first cable holder 31, the first cable holder 31 is held by the second cable holder 32, and the second cable holder 32 holding the first cable holder 31 is mounted to the housing 11. Thus, the optical cable 3 and the glass rod 33 can be easily and firmly fixed together, and the connection of the optical cable 3 to the housing 11 can be easily achieved in a simple fashion.

Further, the outer diameter φ3 of the glass rod 33 coated with the resin film 34 is set smaller than the outer diameter φ1 of the optical cable 3, and the outer diameter φ4 of the glass rod 33 is set equal to or smaller than the outer diameter φ2 of the core member 3a. Accordingly, the axial positioning of the glass rod 33 can be achieved only by inserting the glass rod 33 into the first cable holder 31 and contacting the axial end surface of the glass rod 33 with the axial end surface of the optical cable 3. Thus, the glass rod 33 can be easily and simply mounted.

Further, since the glass rod 33 is fixed to the first cable holder 31 via the resin film 34 interposed therebetween, the glass rod 33 can be securely fixed without being damaged even by caulking the first cable holder 31 at the portion 35. Further, since the glass rod 33 can be fixed to the first cable holder 31 simply by caulking the appropriate portion 35 of the first cable holder 31, the glass rod 33 can be attached to the optical cable 3 through the simple and easy operation so that the working efficiency is improved.

In the foregoing explanation, the assembly 30 is connected to the light unit 2 while holding the optical cable 3. On the other hand, the optical cable 3 may be connected to the assembly 30 after the assembly 30 is connected to the light unit 2.

In this case, the glass rod 33 coated with the resin film 34 is inserted into the first cable holder 31, and then the appropriate portion of the first cable holder 31 is caulked. Subsequently, the first cable holder 31 holding the glass rod 33 coated with the resin film 34 is inserted into the second cable holder 32. Then, the second cable holder 32 holding such a first cable holder 31 is inserted into the opening 11a of the boss portion 11b of the housing 11 until the flange 32b of the second cable holder 32 abuts the boss portion 11b. Thereafter, the screws 37 are inserted into the screw holes 32d of the flange 32b and further threaded into the screw holes 11c of the boss portion 11b.

Then, the axial end portion of the optical cable 3 with the nut 36 received around it is inserted into the first cable holder 31 and, by rotating the nut 36 while engaging with the male screw portion 32a of the second cable holder 32, the annular flange 31a of the first cable holder 31 is firmly held between the stopper 36a of the nut 36 and the axial end of the second cable holder 32. In this fashion, the first cable holder 31 is fixed to the second cable holder 32, and the optical cable 3 is connected to the housing 11.

In the foregoing explanation, the glass rod 33 is fixed to the first cable holder 31 by caulking the appropriate portion of the first cable holder 31. However, various other fixing means can be used instead of the caulking. Hereinbelow, modifications for fixing the glass rod 33 relative to the first cable holder 31 will be described.

Modification 1

FIG. 10 is a diagram showing the first modification. The first modification differs from the foregoing third preferred embodiment in that the first cable holder 31 is formed with screw holes 31d and, by threading locking screws (not shown) into the screw holes 31d, the glass rod 33 is fixed to the first cable holder 31.

In the first modification thus structured, the optical cable 3 is first inserted into the first cable holder 31 until the axial end of the optical cable 3 reaches the step portion α formed between the first and second through holes 31b and 31c.

Then, the glass rod 33 coated with the resin film 34 is inserted into the first cable holder 31 until the axial end of the glass rod 33 abuts the axial end of the optical cable 20. Subsequently, the locking screws are threaded into the screw holes 31d of the first cable holder 31 so that the glass rod 33 coated with the resin film 34 is integrally fixed to the optical cable 3 via the first cable holder 31. In this case, since the glass rod 33 is coated with the resin film 34, the glass rod 33 is not damaged when the locking screws are threaded into the screw holes 31d.

Modification 2

FIG. 11 is a diagram showing the second modification. The second modification differs from the foregoing third preferred embodiment in that the first cable holder 31 is formed with a male screw portion 31e on the axial end circumference thereof at the side of the light unit 2 and that a metal cap 38 is threaded over the male screw portion 31e.

In the second modification thus structured, the optical cable 3 is first inserted into the first cable holder 31 until the axial end of the optical cable 3 reaches the step portion α formed between the first and second through holes 31b and 31c.

Then, the glass rod 33 coated with the resin film 34 is inserted into the first cable holder 31 until the axal end of the glass rod 33 abuts the axial end of the optical cable 20. Subsequently, the metal cap 38 is threaded over the male screw portion 31e of the first cable holder 31 so that the glass rod 33 is fixed relative to the first cable holder 31. In this fashion, the glass rod 33 coated with the resin film 34 is integrally fixed to the optical cable 3 via the first cable holder 31.

As seen from FIG. 11, the metal cap 38 has an opening at the center thereof for receiving through the reflected light from the reflecting mirror 14.

Modification 3

FIG. 12 is a diagram showing the third modification. The third modification differs from the foregoing third preferred embodiment in that the first cable holder 31 is formed with a cut-out portion 31f at the axial end thereof at the side of the light unlit 2 and that a cylindrical metal collar 39 is press-fit into the cut-out portion 31f.

In the third modification thus structured, the optical cable 3 is first inserted into the first cable holder 31 until the axial end of the optical cable 3 reaches the step portion α formed between the first and second through holes 31b and 31c.

Then, the glass rod 33 coated with the resin film 34 is inserted into the first cable holder 31 until the axial end of the glass rod 33 abuts the axial end of the optical cable 20. Subsequently, the cylindrical metal collar 39 is press-fit into the cut-out portion 31f of the first cable holder 31 so that the glass rod 33 is fixed relative to the first cable holder 31. In this fashion, the glass rod 33 coated with the resin film 34 is integrally fixed to the optical cable 3 via the first cable holder 31.

In the foregoing third preferred embodiment and the foregoing first to third modifications thereof, it may also be arranged that an adhesive is applied between the resin film 34 and the first cable holder 31 in advance, that is, before the glass rod 33 is fixed by means of the caulking, the locking screws, the metal cap or the cylindrical metal collar. This fixes together the glass rod 33 and the first cable holder 31 more firmly.

Figure 13:
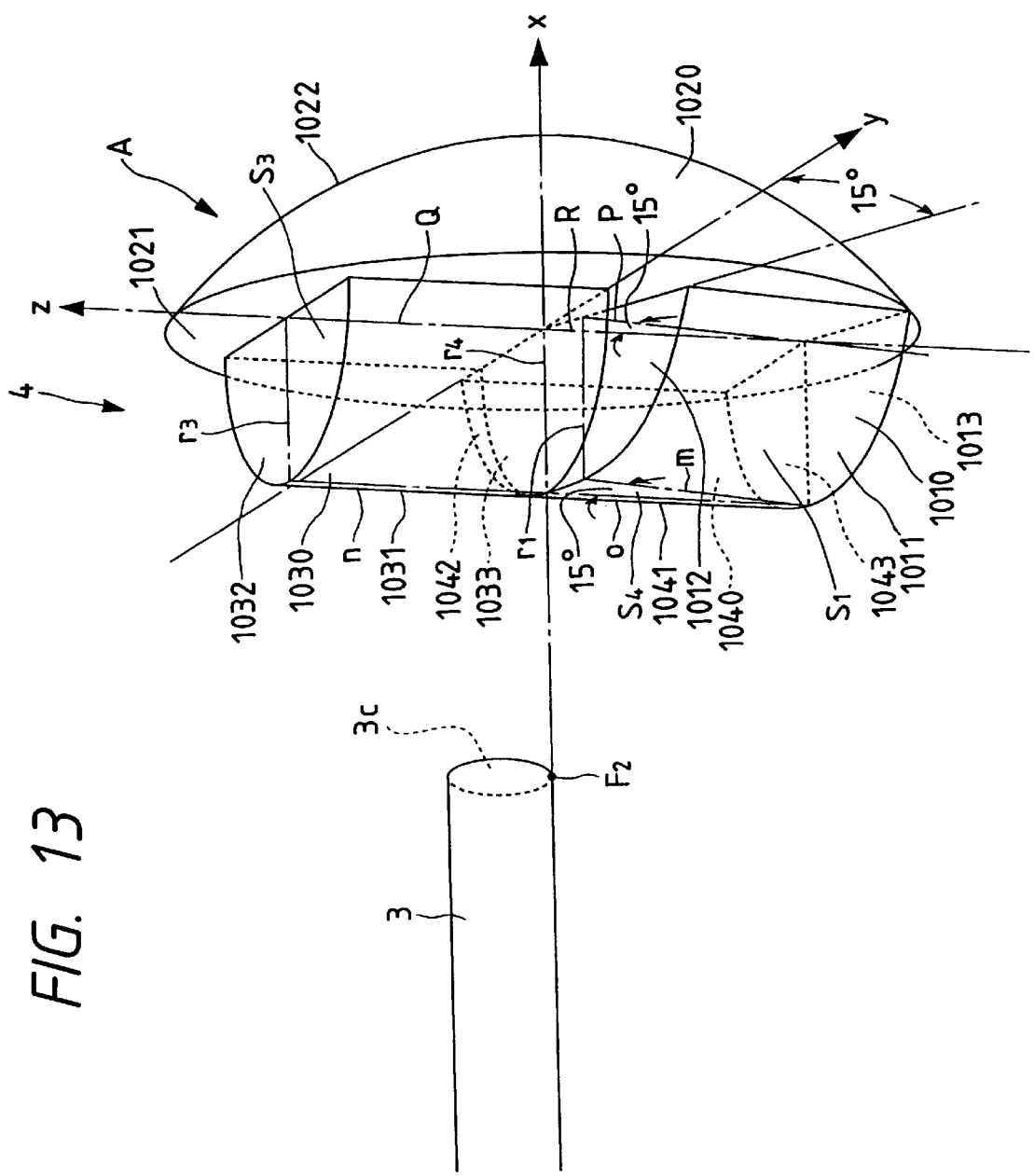
FIG. 13 is a perspective view showing a light distribution compound lens of a light distribution unit of the discharge lamp device shown in FIG. 1, according to a fourth preferred embodiment of the present invention.
Figure 14:
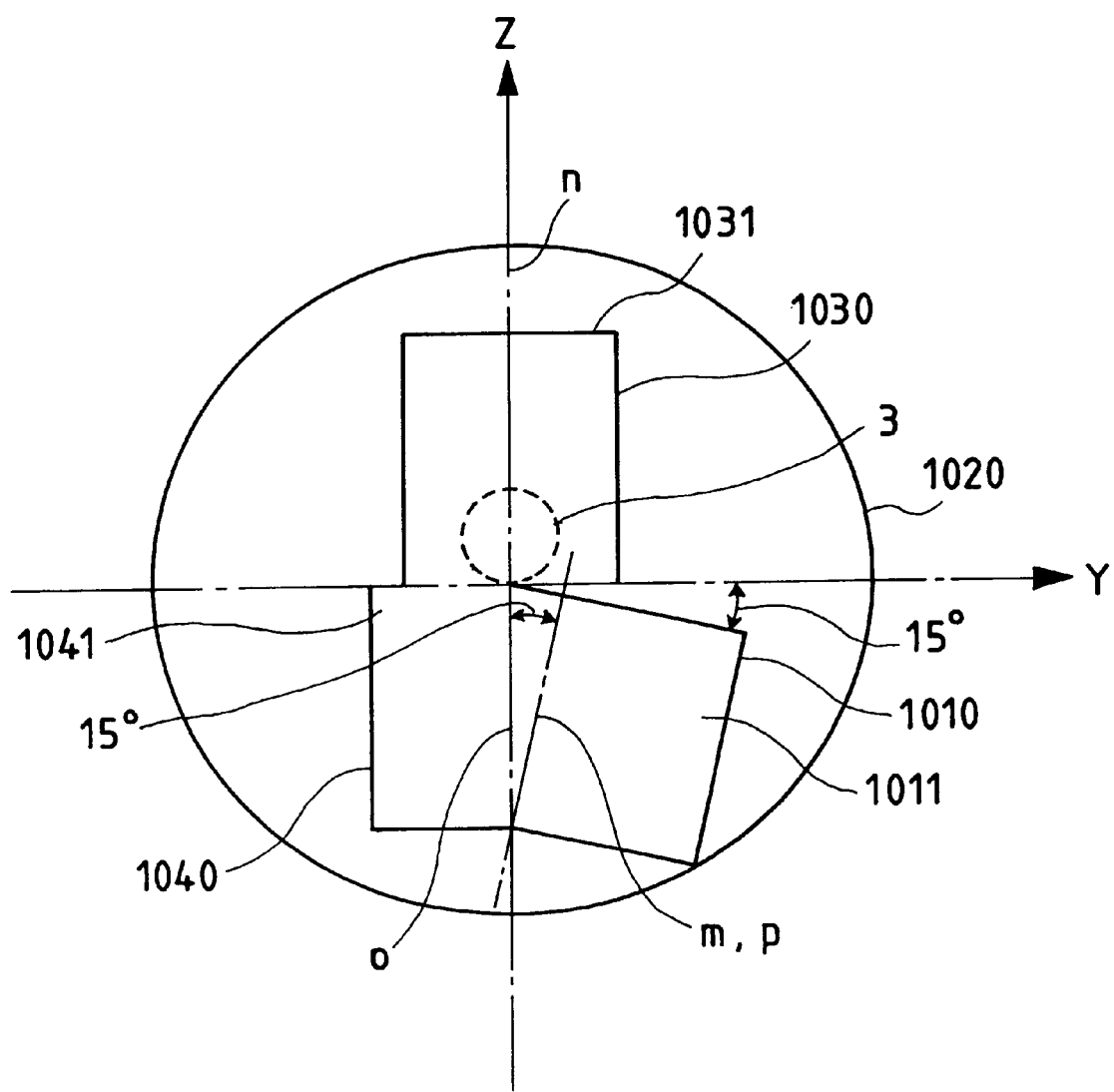
FIG. 14 is a plan view of the light distribution compound lens shown in FIG. 13 and seen from the incident side of light.
Figure 15:
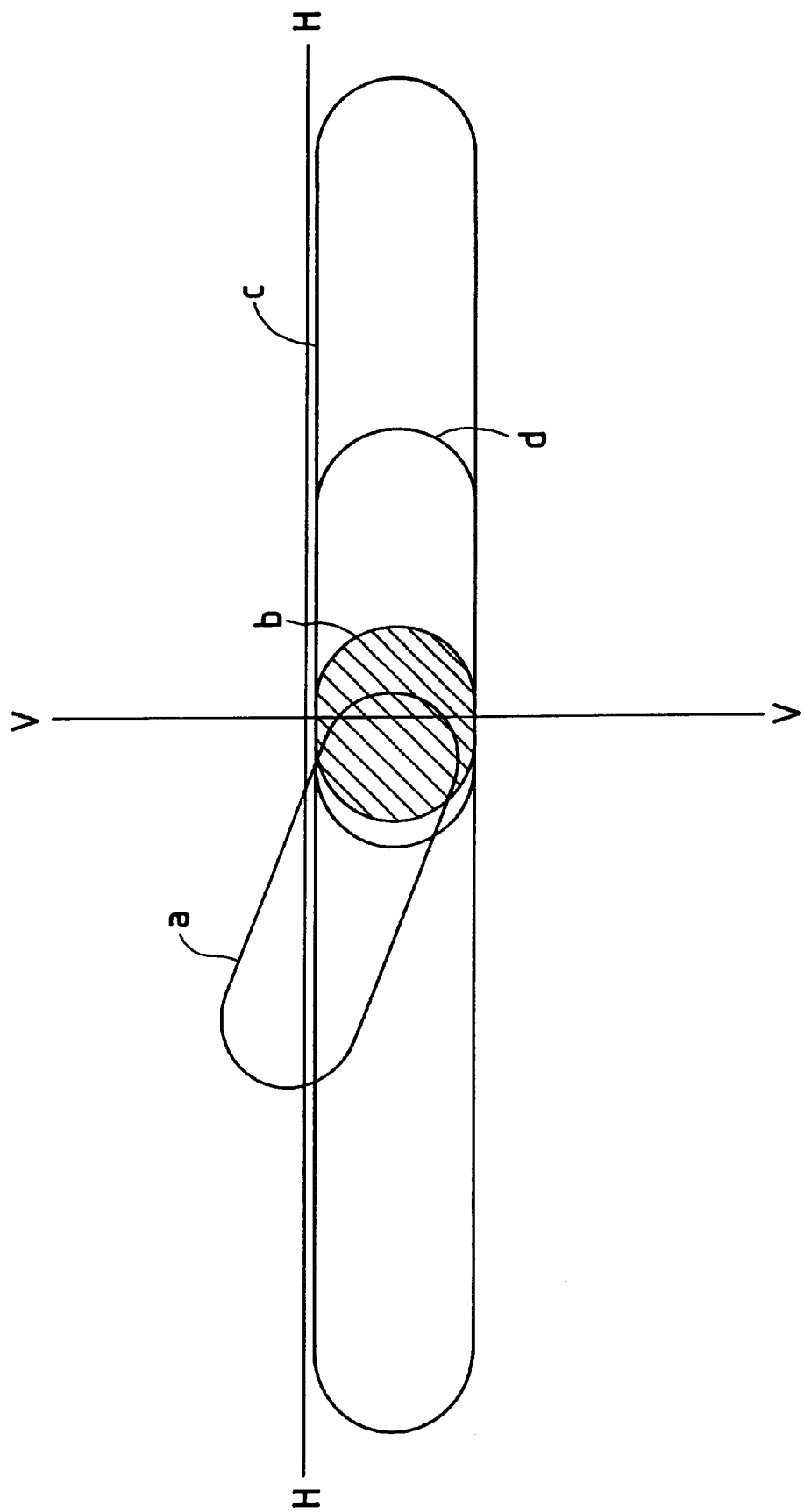
FIG. 15 is a diagram showing a light distribution of luminous flux irradiated through the light distribution compound lens shown in FIGS. 13 and 14.

Now, the fourth preferred embodiment of the present invention will be described hereinbelow with reference to FIGS. 13 to 17. FIG. 13 is a perspective view showing a light distribution compound lens A of one of the light distribution units 4, both having the same structure, according to the fourth preferred embodiment of the present invention. FIG. 14 is a plan view of the light distribution compound lens A shown in FIG. 13 and seen from the incident side of the light. FIG. 15 is a diagram showing a light distribution of the luminous flux irradiated through the light distribution compound lens A shown in FIGS. 13 and 14. In FIGS. 13 and 14, the light distribution compound lens A is composed of a first lens portion 1020 of an essentially hemispheric shape, a second lens portion 1010 of an essentially quarter cylindrical shape, a third lens portion 1030 of an essentially semicylindrical shape and a fourth lens portion 1040 of an essentially quarter cylindrical shape. Accordingly, the second, third and fourth lens portions 1010, 1030 and 1040 each have a shape as a cylindrical lens.

Each of the lens portions 1010, 1020, 1030 and 1040 is made of a material which is excellent in light transmittance, such as polycarbonate or acrylic resin. The lens portions 1010, 1020, 1030 and 1040 may be formed integral with each other, or may be formed separate from each other and then bonded together using an adhesive which has a refractive index substantially equal to the material of each lens portion.

The first lens portion 1020 includes an incidence plane 1021 where the luminous flux emitted through an irradiation plane 3c of the optical cable 3 directly enters, and an irradiation plane 1022 which converges and irradiates the luminous flux incident upon the lens portions 1010, 1030 and 1040 and the luminous flux directly incident upon the incidence plane 1021. The irradiation plane 1022 is of a shape of a convex lens having a focal point $F_2$ near a lower end of the irradiation plane 3c of the optical cable 3. Thus, as shown in FIG. 15, the luminous flux directly incident upon the incidence plane 1021, that is, without passing Through the lens portions 1010, 1030 and 1040, forms a hot zone light distribution (see portion b in FIG. 15) irradiating a center portion brightly.

The second lens portion 1010 is a cylindrical lens of an essentially quarter cylindrical shape having a radius r1 and is arranged within the incidence plane 1021 of the first lens portion 1020. The luminous flux emitted from the discharge lamp 12 (see FIG. 8) is guided by the optical cable 3 and irradiated through the irradiation plane 3c of the optical cable 3. The second lens portion 1010 has an incidence plane 1011 upon which the luminous flux from the optical cable 3 is incident. The incidence plane 1011 is formed into a cylindrical surface, as a curved surface of a cylindrical lens, by a portion (essentially a quarter) of an outer circumference of a cylinder which is obtained by rotating a first section $S_1$ about a first principal axis P. The first principal axis P is inclined right in FIG. 14 by a given angle (preferably 15°) relative to a vertical line (z axis) which is vertical and orthogonal to an optical axis (x axis). The first section $S_1$ is defined by the first principal axis P and a first longitude line m parallel to the first principal axis P and spacing the radius r1 from the first principal axis P. Further, each of an upper end surface 1012 and a lower end surface 1013 of the second lens portion 1010 is inclined downward in FIGS. 13 and 14 by a given angle (preferably 15°) relative to a horizontal axis (y axis).

Figure 16:
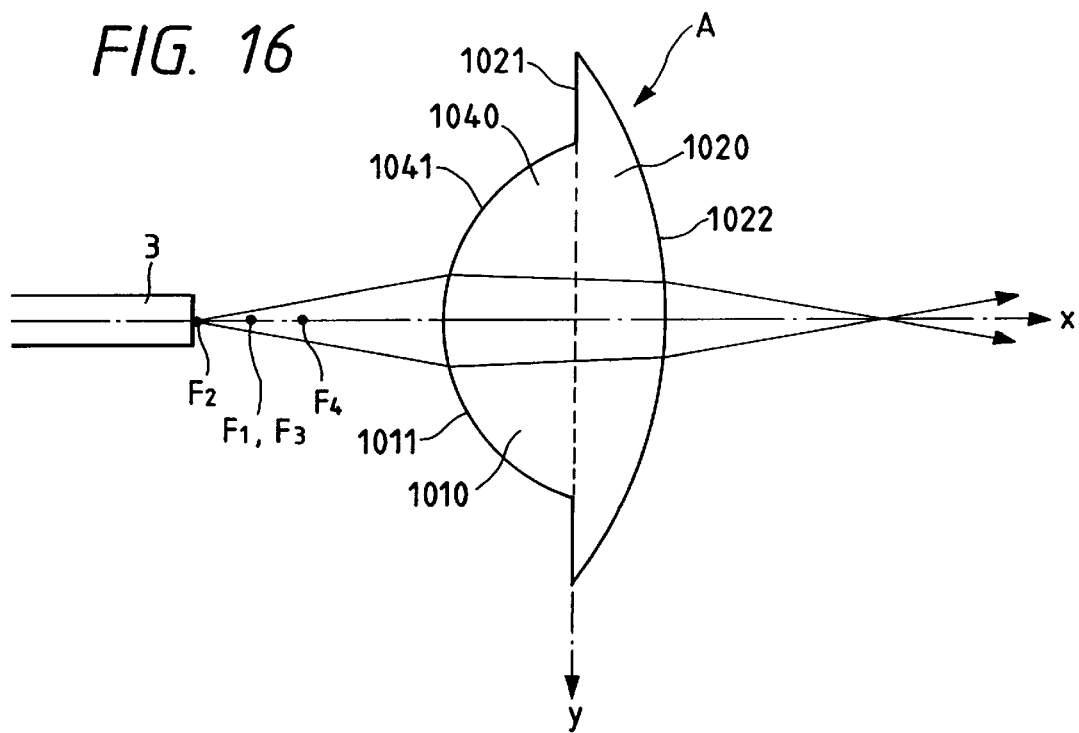
FIG. 16 is a diagram showing the state of light wherein the light enters a second lens portion and a fourth lens portion and exits from a first lens portion.

As shown in FIG. 16, a focal point $F_1$ of the second lens portion 1010 is set to be located at an intermediate portion between the focal point $F_2$ of the first lens portion 1020 and a focal point $F_4$ of the fourth lens portion 1040 which will be described later. Further, as described above, the first principal axis P of the second lens portion 1010 and the first longitude line m of the second lens portion 1010 parallel to the first principal axis P are inclined right by the given angle (preferably 15°) relative to the vertical line (z axis), and the incidence plane 1011 of the second lens portion 1010 is given as the cylindrical surface. Accordingly, as shown in FIG. 15, due to refractive action at the curved surface (incidence plane 1011), the luminous flux entering the incidence plane 1011 and leaving the irradiation plane 1022 of the first lens portion 1020 forms a cutline light distribution (see portion a in FIG. 15) which is inclined upward in a left direction in FIG. 15, relative to a horizontal axis (H—H) by 15°.

The third lens portion 1030 is a cylindrical lens of an essentially semicylindrical shape having a radius, r3 and is arranged adjacent to the second lens portion 1010 at an upper side thereof. The third lens portion 1030 has an incidence plane 1031 upon which the luminous flux irradiated through the irradiation plane 3c of the optical cable 3 is incident. The incidence plane 1031 is formed into a cylindrical surface, as a curved surface of a cylindrical lens, by a portion (essentially a half) of an outer circumference of a cylinder which is obtained by rotating a third section $S_3$ about a third principal axis Q. The third principal axis Q is parallel to the vertical line (z axis) which is vertical and orthogonal to the optical axis (x axis). The third section $S_3$ is defined by the third principal axis Q and a third longitude line n parallel to the third principal axis Q and spacing the radius r3 from the third principal axis Q. Further, each of an upper end surface 1032 and a lower end surface 1033 of the third lens portion 1030 is set parallel to the horizontal axis (y axis).

Figure 17:
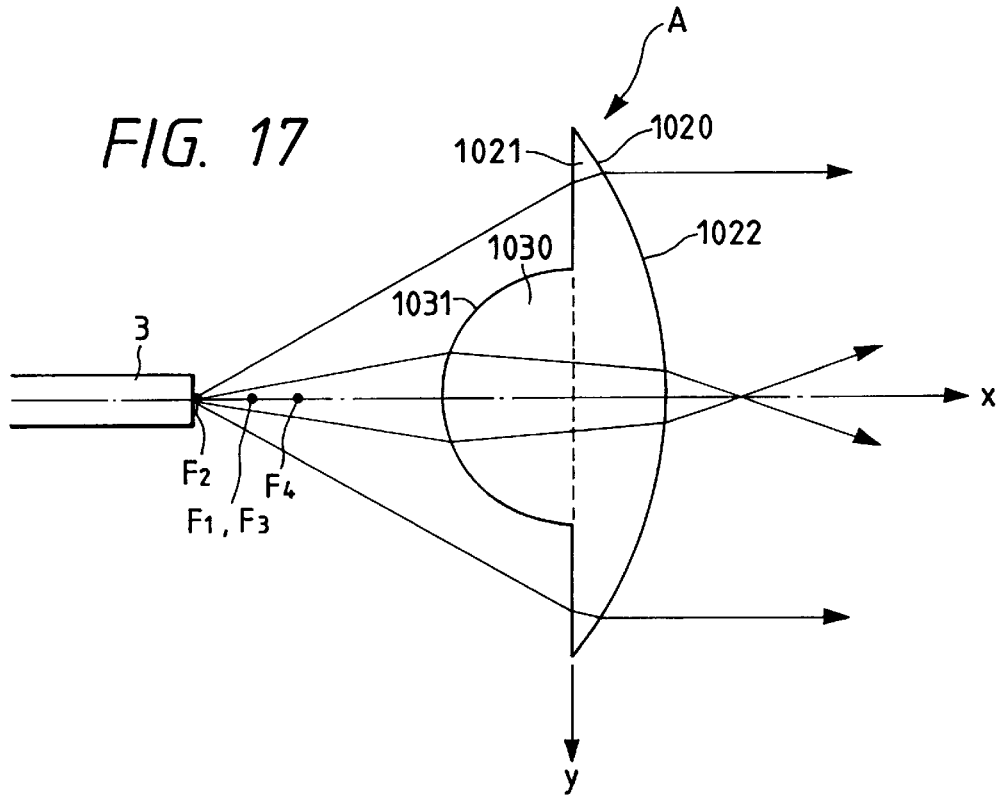
FIG. 17 is a diagram showing the state of light wherein the light enters a third lens portion and exits from the first lens portion.

As shown in FIG. 17, like the focal point $F_1$ of the second lens portion 1010, a focal point $F_3$ of the third lens portion 1030 is set to be located at an intermediate portion between the focal point $F_2$ of the first lens portion 1020 and the focal point $F_4$ of the fourth lens portion 1040. Further, as described above, the third principal axis Q and the third longitude line n of the third lens portion 1030 are set parallel to the vertical line (z axis), and the incidence plane 1031 of the third lens portion 1030 is given as the cylindrical surface. Accordingly, as shown in FIG. 17, due to refractive action at the curved surface (incidence plane 1031), the luminous flux entering the incidence plane 1031 of the third lens portion 1030 is deflected toward the center side of the third lens portion 1030 so that the luminous flux leaving the first lens portion 1020 is largely deflected left and right of the first lens portion 1020. As a result, as shown in FIG. 15, the luminous flux forms a flat light distribution (see portion c in FIG. 15) which is largely spread left and right (preferably 70°~80°) below the horizontal axis (H—H), while narrowed in a direction of a vertical axis (V—V) (preferably 7°~8°).

The fourth lens portion 1040 is a cylindrical lens of an essentially quarter cylindrical shape having a radius r4 and is arranged adjacent to the second lens portion 1010 at the left side thereof in FIG. 14. The fourth lens portion 1040 has an incidence plane 1041 upon which the luminous flux irradiated through the irradiation plane 3c of the optical cable 3 is incident. The incidence plane 1041 is formed into a cylindrical surface, as a curved surface of a cylindrical lens, by a portion (essentially a quarter) of an outer circumference of a cylinder which is obtained by rotating a fourth section $S_4$ about a fourth principal axis R. The fourth principal axis R is parallel to the vertical line (z axis) which is vertical and orthogonal to the optical axis (x axis). The fourth section $S_4$ is defined by the fourth principal axis, R and a fourth longitude line o parallel to the fourth principal axis R and spacing the radius r4 from the fourth principal axis R. Further, each of an upper end surface 1042 and a lower end surface 1043 of the fourth lens portion 1040 is set parallel to the horizontal axis (y axis).

As shown in FIG. 16, a focal point $F_4$ of the fourth lens portion 1040 is set to be located forward of the focal point $F_2$ of the first lens portion 1020 relative to the light distribution compound lens A. Further, as described above, the fourth principal axis R and the fourth longitude line o of the fourth lens portion 1040 are set parallel to the vertical line (z axis), and the incidence plane 1041 of the fourth lens portion 1040 is given as the cylindrical surface. Accordingly, as shown in FIG. 16, due to refractive action at the curved surface (incidence plane 1041), the luminous flux entering the incidence plane 1041 of the fourth lens portion 1040 is deflected toward the center side of the fourth lens portion 1040 so that the luminous flux leaving the first lens portion 1020 is deflected left and right of the first lens portion 1020. However, since the fourth lens portion 1040 is arranged adjacent to the second lens portion 1010 at the left side thereof, the luminous flux forms, as shown in FIG. 15, a hot zone light distribution (see portion d in FIG. 15) irradiating the right side relative to the vertical axis (V—V) below the horizontal axis (H—H).

Each of the third and fourth lens portions 1030 and 1040 is provided for forming the light distribution which spreads in the horizontal direction, and hence the curved surface thereof is given as a portion of the cylindrical lens having the axis extending in the vertical direction.

In the fourth preferred embodiment thus structured, the luminous flux irradiated through the irradiation plane 3c of the optical cable 3 enters the second lens portion 1010 and exits from the first lens portion 1020 so as to form the cutline light distribution (see portion a in FIG. 15) which is inclined upward in the left direction relative to the horizontal axis (H—H) by 15°. At the same time, the luminous flux irradiated through the irradiation plane 3c of the optical cable 3 directly enters the first lens portion 1020 and exits therefrom so as to form the hot zone light distribution (see portion b in FIG. 15) irradiating the center portion brightly. At the same time, the luminous flux irradiated through the irradiation plane 3c of the optical cable 3 enters the third lens portion 1030 and exits from the first lens portion 1020 so as to form the flat light distribution (see portion c in FIG. 15) which is largely spread left and right (preferably 70°~80°) below the horizontal axis (H—H), while narrowed in the direction of the vertical axis (V—V) (preferably 7°~8°). At the same time, the luminous flux irradiated through the irradiation plane 3c of the optical cable 3 enters the fourth lens portion 1040 and exits from the first lens portion 1020 so as to form the hot zone light distribution (see portion d in FIG. 15) irradiating the right side relative to the vertical axis (V—V) below the horizontal axis (H—H).

By the combination of such light distributions, the light distribution suitable for the vehicular headlight can be achieved. Specifically, the achieved light distribution irradiates brightly a pedestrian or the like at the forward left of the vehicle. Further, the achieved light distribution spreads forward left and right of the vehicle and irradiates brightly far in the distance in the forward direction of the vehicle so that a car running in the opposite direction does not suffer the dazzle of the headlight.

Now, modifications of the foregoing fourth preferred embodiment will be described hereinbelow.

Modification 1

In the fourth preferred embodiment, the second lens portion has the essentially quarter cylindrical shape, the third lens portion has the essentially semicylindrical shape, the fourth lens portion has the essentially quarter cylindrical shape, and a side, at the incident side, of each of the vertical sections thereof is linear. Accordingly, aberration of the luminous flux incident upon each of those lens portions and irradiated through the first lens portion gradually increases toward the boundary from the center, and the light distribution generated by such irradiation is ambiguous at the boundary. In the following first modification, the aberration of each lens portion is corrected to provide a cutline light distribution which is distinct at the boundary.

Figure 18:
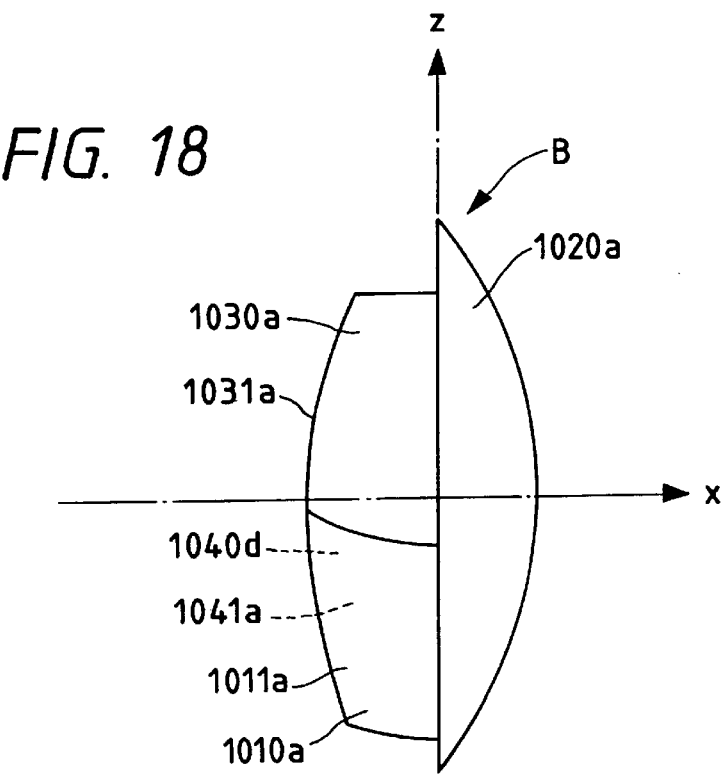
FIG. 18 is a side view showing a first modification of the fourth preferred embodiment.

FIG. 18 is a diagram showing the first modification. In the first modification, a light distribution compound lens, B is composed of a first lens portion 1020a of an essentially hemispheric shape, a second lens portion 1010a of an essentially quarter cylindrical shape, a third lens portion 1030a of an essentially semicylindrical shape and a fourth lens portion 1040a of an essentially quarter cylindrical shape. Since the first lens portion 1020a is the same as the first lens portion 1020 in the foregoing fourth preferred embodiment, explanation thereof will be omitted.

The second lens portion 1010a has an incidence plane 1011a forming a curved surface which bends toward the first longitude line m shown in FIGS. 13 and 14, that is, forming arm inclined curved surface where the outer rim of the first section S1 bends inward. While the incidence plane 1011 in FIG. 13 forms the cylindrical surface, the incidence plane 1011a forms the inclined curved surface, that is, the surface of a barrel shape. The third lens portion 1030a has an incidence plane 1031a forming a curved surface which bends toward the third longitude line n shown in FIGS. 13 and 14, that is, forming an inclined curved surface. The fourth lens portion 1040a has an incidence plane 1041a forming a curved surface which bends toward the fourth longitude line o shown in FIGS. 13 and 14, that is, forming an inclined curved surface.

In the first modification thus structured, the incidence plane 1011a of the second lens portion 1010a, the incidence plane 1031a of the third lens portion 1030a and the incidence plane 1041a of the fourth lens portion 1040a are formed into the inclined curved surfaces, respectively. Thus, no aberration exists in the luminous flux entering each of the lens portions 1010a, 1030a and 1040a and irradiated through the first lens portion 1020a. Accordingly, the upper boundary of the light distribution generated by such irradiation is made distinct to achieve the clear cutline light distribution. This makes it possible to prevent the car running in the opposite direction from suffering the dazzle of the headlight, and further to irradiate the pedestrian brightly.

Only one or two of the incidence plane 1011a of the second lens portion 1010a, the incidence plane 1031a of the third lens portion 1030a and the incidence plane 1041a of the fourth lens portion 1040a may be formed into the inclined curved surface or surfaces.

Modification 2

In the foregoing fourth preferred embodiment, a difference in illuminance of the flat light distribution (see portion c in FIG. 15) is caused relative to the cutline light distribution see portion a in FIG. 15) and the hot zone light distribution (see portion d in FIG. 15). Thus, the irradiated light distribution looks somewhat incompatible. In the following second modification, illuminance at the center portion of the flat light distribution is increased while gradually lowered toward the left and right boundaries from the center portion.

Figure 19:
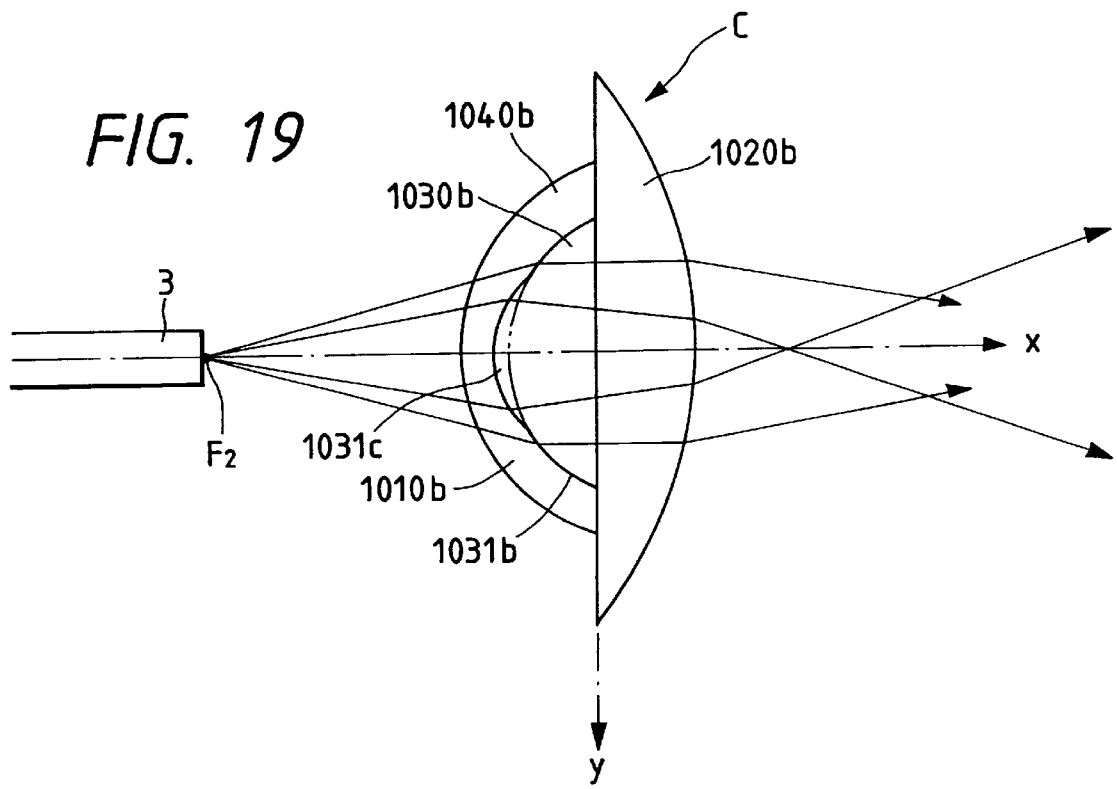
FIG. 19 is a top view showing a second modification of the fourth preferred embodiment.
Figure 20A:
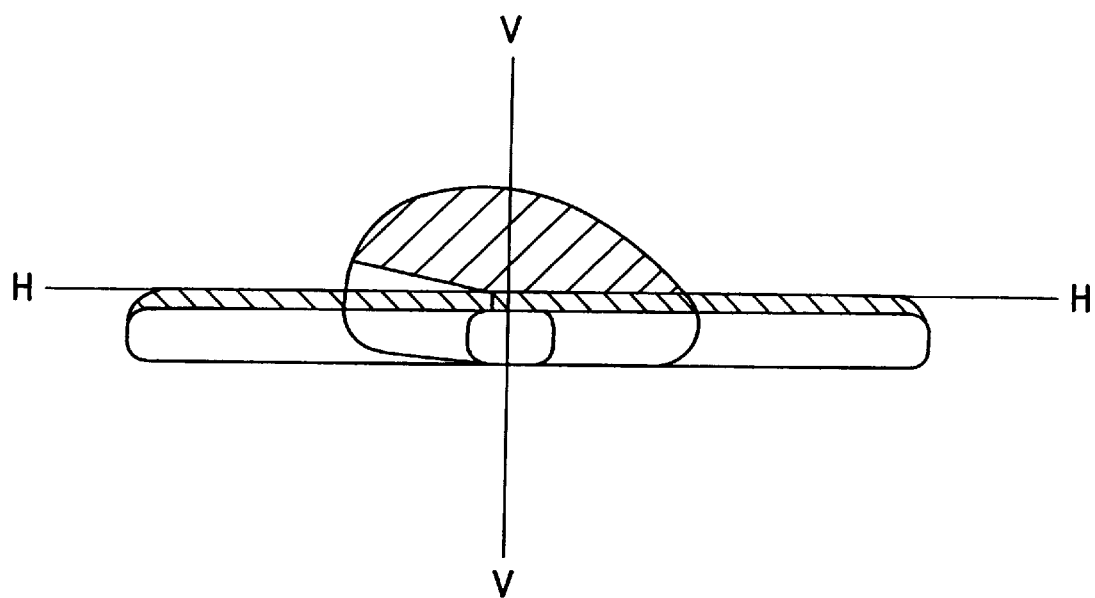
FIGS. 20A and 20B are diagrams each showing a light distribution of luminous flux irradiated through a conventional condenser lens unit (light distribution compound lens).
Figure 20B:
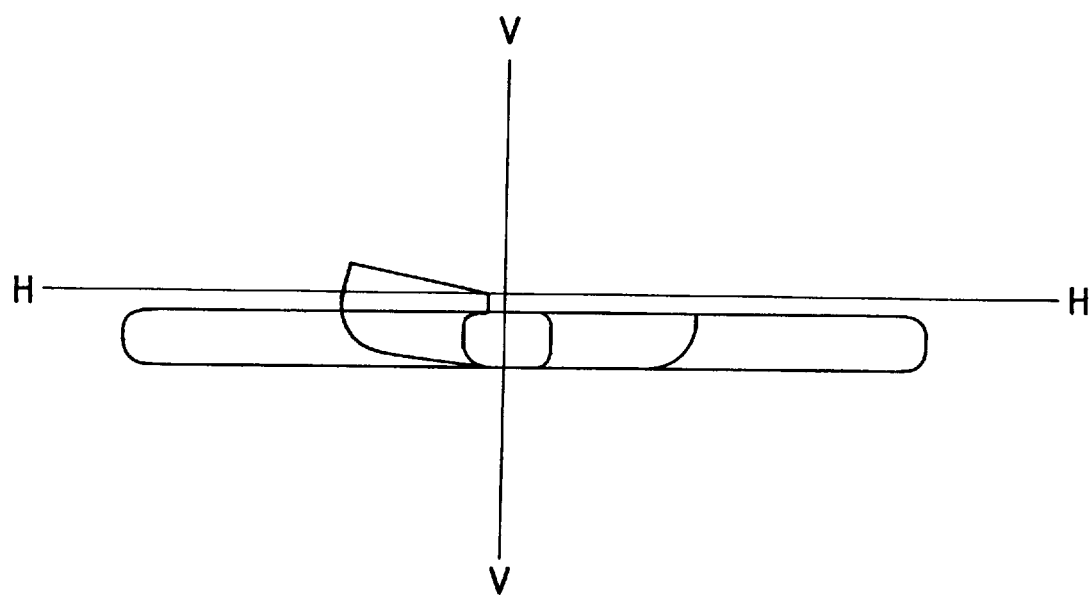

FIG. 19 is a diagram showing the second modification. In the second modification, a light distribution compound lens C is composed of a first lens portion 1020b of an essentially hemispheric shape, a second lens portion 1010b of an essentially quarter cylindrical shape, a third lens portion 1030b of an essentially semicylindrical shape and a fourth lens portion 1040b of an essentially quarter cylindrical shape. Since the first lens portion 1020b, the second lens portion 1010b and the fourth lens portion 1040b are the same as the first lens portion 1020, the second lens portion 1010 and the fourth lens portion 1040 in the foregoing fourth preferred embodiment, explanation thereof will be omitted.

The third lens portion 1030b has an incidence plane forming a plurality of curved surfaces having different radii of curvature. In FIG. 19, a radius of curvature at a center portion 1031c of the incidence plane of the third lens portion 1030b is set smaller than that of a peripheral portion 1031b thereof.

In the second modification thus structured, since the radius of curvature of the center portion 1031c of the incidence plane of the third lens portion 1030b is set small, the luminous flux irradiated through the first lens portion 1020b converges to the center. Thus, the difference in illuminance of the flat light distribution (see portion c in FIG. 15) relative to the cutline light distribution (see portion a in FIG. 15) and the hot zone light distribution (see portion d in FIG. 15) is reduced. Accordingly, the brightness of the light distributions changes continuously and spreads largely in the left and right directions to make the boundaries ambiguous. This highly reduces the incompatibility of the light distribution.

In the foregoing second modification, the radius of curvature of the center portion 1031c of the incidence plane of the third lens portion 1030b is set smaller than that of the peripheral portion 1031b thereof. On the other hand, by changing the radius of curvature in a multistage fashion, the difference in illuminance can be further reduced to provide the light distribution whose boundaries are further ambiguous. Further, if the radii of curvature of the incidence planes 1011b and 1041b of the second lens portion 1010b and the fourth lens portion 1040b are also changed in a multistage fashion, the difference in illuminance can be further reduced to provide the light distribution whose boundaries are further ambiguous.

In the foregoing fourth preferred embodiment and the first and second modifications thereof, the second lens portion 1010, 1010a, 1010b is arranged at the right of the optical axis (x axis) and the fourth lens portion 1040, 1040a, 1040b is arranged at the left of the optical axis (x axis), so as to form the light distribution inclined upward in the left direction, the hot zone light distribution and the flat light distribution which are suitable for achieving the vehicular light distribution for the left-hand traffic. On the other hand, it is also possible to form a light distribution inclined upward in the right direction, a hot zone light distribution and a flat light distribution which are suitable for achieving a vehicular light distribution for the right-hand traffic. In this case, the second lens portion 1010, 1010a, 1010b is arranged at the left of the optical axis (x axis), the fourth lens portion 1040, 1040a, 1040b is arranged at the right of the optical axis (x axis), and the first principal axis of the second lens portion 1010, 1010a, 1010b is inclined left by a given angle (preferably 15°) relative to the vertical line (z axis).

Further, the second lens portion 1010, 1010a, 1010b may be inclined not only left or right relative to the z axis on the y-z plane, but also forward or backward on the x-z plane.

In the foregoing fourth preferred embodiment and the first and second modifications thereof, the curved surface of the cylindrical lens is formed by a portion of the surface of the solid of revolution defined by the rotation axis and the longitude line spacing the given radius from the rotation axis, that is, by a portion of the surface of the simple cylinder in the fourth preferred embodiment and by a portion of the surface of the barrel shape in the first modification. Accordingly, the axis of the cylindrical lens coincides with the rotation axis. On the other hand, the curved surface of the cylindrical lens can be selected depending on a demand for light distribution.

For example, the curved surface of the cylindrical lens is not limited to a curved surface obtained by rotating a single principal axis as a rotation axis, but may be in the form of a composite curved surface including a plurality of curved surfaces obtained by rotating a plurality of principal axes as respective rotation axes. Further, it may also be arranged that two rotation axes are set and a longitude line is rotated using the two rotation axes as the two origins of an ellipse so as to use a curved surface, which is obtained as an elliptical locus, as the curved surface of the cylindrical lens. Further, instead of using a quarter or half of the cylindrical lens as the second, third or fourth lens portion, a portion obtained by cutting the cylindrical lens along a chord of a circular section thereof may be used therefor. In this case, the axis of the cylindrical lens can be properly set as an extending direction of the curved surface.

Further, in the foregoing fourth preferred embodiment and the first and second modifications thereof, the light distributing shape of the irradiated light is determined without using the shade plate. On the other hand, for achieving more distinct cutline light distribution, the shade plate may be provided at the lower end of the irradiation plane 3c of the optical cable 3. In this case, it is preferable that the focal points of the respective lens portions are located at cut positions of the shade plate.

While the present invention has been described in terms of the preferred embodiments, the invention is not to be limited thereto, but can be embodied in various ways without departing from the principle of the invention as defined in the appended claims.

What is claimed is:

1. A discharge lamp device including a light distribution compound lens for forming a given light distribution, said light distribution compound lens comprising:

a first lens portion for condensing and irradiating light from a discharge lamp; and a second lens portion, provided at a side of said first lens portion closer to said discharge lamp, for deflecting the light from said discharge lamp in a given direction before said light is condensed by said first lens portion, wherein a curved surface of said second lens portion is given as a curved surface of a cylindrical lens, and wherein said cylindrical lens has an axis inclined by a given angle in one of left and right directions relative to a vertical direction and forms a slantly extending cutline light distribution depending on said inclination angle of said axis.

2. The discharge lamp device according to claim 1, wherein said second lens portion is located below an optical axis of said light distribution compound lens.

3. The discharge lamp device according to claim 1, wherein said light distribution compound lens further comprises a third lens portion, provided at the side of said first lens portion closer to said discharge lamp, for deflecting the light from said discharge lamp in a given direction before said light is condensed by said first lens portion, wherein a curved surface of said third lens portion is given as a curved surface of a cylindrical lens, and wherein said cylindrical lens has an axis set in the vertical direction and forms a flat light distribution spreading in a horizontal direction.

4. The discharge lamp device according to claim 1, wherein the curved surface of said second lens portion further bends along said axis.

5. The discharge lamp device according to claim 3, wherein an incidence plane of said third lens portion is formed by combining a plurality of curved surfaces having different radii of curvature, and wherein the radii of curvature of the plurality of curved surfaces are set smaller as located closer to a center portion of said third lens portion.

6. The discharge lamp device according to claim 1, further comprising an optical cable coupling assembly for connecting together a housing with said discharge lamp therein and a synthetic resin optical cable composed of a core member and a clad member for transmitting the light emitted from said discharge lamp to said light distribution compound lens, said optical cable coupling assembly comprising:

a cable holder holding said synthetic resin optical cable and attached to said housing; and a glass rod inserted into said cable holder so as to abut an end surface of said synthetic resin optical cable and having a function of a heat cut filter, wherein a resin film having a refractive index smaller than that of said glass rod is provided on a surface of said glass rod, and wherein said glass rod is fixed to said cable holder via said resin film.

7. The discharge lamp device according to claim 6, wherein said cable holder comprises a first cable holder holding said synthetic resin optical cable and said glass rod in a fixed fashion, and a second cable holder holding said first cable holder and attached to said housing.

8. The discharge lamp device according to claim 6, wherein an outer diameter of said glass rod with said resin film provided thereon is set smaller than an outer diameter of said synthetic resin optical cable, and wherein an outer diameter of said glass rod is set equal to or smaller than an outer diameter of said core member of said synthetic resin optical cable.

9. The discharge lamp device according to claim 6, wherein said glass rod is fixed to said cable holder by caulking an appropriate portion of said cable holder.

10. The discharge lamp device according to claim 1, wherein said first and second lens portions are formed integral with each other.

11. The discharge lamp device according to claim 1, wherein said first and second lens portions are bonded together.

* * * * *